(12) United States Patent
Sato et al.

(10) Patent No.: US 7,305,247 B2
(45) Date of Patent: Dec. 4, 2007

(54) CELL CONTROL METHOD AND CELL SYSTEM

(75) Inventors: Hijin Sato, Yokohama (JP); Narumi Umeda, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 775 days.

(21) Appl. No.: 09/964,904

(22) Filed: Sep. 27, 2001

(65) Prior Publication Data

US 2002/0077142 A1 Jun. 20, 2002

(30) Foreign Application Priority Data

Sep. 29, 2000 (JP) ............................. 2000-300975
Oct. 11, 2000 (JP) ............................. 2000-311229

(51) Int. Cl.
*H04Q 7/20* (2006.01)
(52) U.S. Cl. .................. 455/525; 455/524; 455/456.5; 455/456.6
(58) Field of Classification Search ............... 455/525, 455/524, 424, 446, 456.5, 456.6, 522; 370/350
See application file for complete search history.

(56) References Cited

U.S. PATENT DOCUMENTS

| | | | |
|---|---|---|---|
| 5,095,500 A | 3/1992 | Tayloe et al. ................. 379/32 |
| 5,528,247 A | 6/1996 | Nonami ....................... 342/357 |
| 5,551,058 A | 8/1996 | Hutcheson et al. ........ 455/33.2 |
| 5,832,368 A | 11/1998 | Nakano et al. ............... 455/63 |
| 5,884,163 A | 3/1999 | Hardouin .................... 455/423 |
| 6,882,845 B2 | 4/2005 | Sato et al. .................. 455/446 |
| 2003/0199269 A1 | 10/2003 | Tobe et al. .............. 455/422.1 |

FOREIGN PATENT DOCUMENTS

| | | |
|---|---|---|
| GB | 2271486 A | 4/1994 |
| JP | 07298334 A | 11/1985 |

(Continued)

OTHER PUBLICATIONS

Official Notice of Rejection, Case No.: DCMH120150, Patent Application No.: 2000-300975 (*copy attached hereto as Article 1*).

(Continued)

*Primary Examiner*—Melur Ramakrishnaiah
(74) *Attorney, Agent, or Firm*—Workman Nydegger

(57) ABSTRACT

The present invention allows the cell shape of any base station in operation to be changed, thereby enabling services to be provided according to the needs. A mobile terminal attempts to synchronize with a perch channel to thereby check whether or not it can receive the signal, thereby determining whether it belongs to the cell of the base station. The mobile terminal uses the GPS to obtain location information to identify the location and notifies a cell control apparatus of results for cell determinations and location information. The cell control apparatus selects a base station for which the corresponding cell shape is to be changed, on the basis of the results for cell determinations and the location information. The cell control apparatus instructs the selected base station to change its cell shape. The base station changes its cell shape according to the instruction.

14 Claims, 18 Drawing Sheets

| FOREIGN PATENT DOCUMENTS | | |
|---|---|---|
| JP | 07-170566 | 7/1995 |
| JP | 09-065422 | 3/1997 |
| JP | 09-284859 | 10/1997 |
| JP | 10-023514 | 1/1998 |
| JP | 11-004476 | 1/1999 |
| JP | 11-163784 | 6/1999 |

OTHER PUBLICATIONS

Official Notice of Rejection Patent Application No.: 2000-311229 Case No.: DCMH120177, no date.
Official Notice of Rejection Patent Application No.: 2000-300975 Case No.: DCMH120150, no date.
Austrian Patent Office Service and Information Sector (TRF) Search Report Singapore Application 200105890-8, no date.

○ SERVICE PROVIDING AREAS OF RADIO COMMUNICATION SYSTEM A
○ SERVICE PROVIDING AREAS OF RADIO COMMUNICATION SYSTEM B
▨ TERMINAL

▨ BASE STATIONS OF RADIO COMMUNICATION SYSTEM A

▨ BASE STATIONS OF RADIO COMMUNICATION SYSTEM B

CELL CONTROL METHOD AND CELL SYSTEM

This application claims priority under 35 U.S.C. 119 to Japanese Patent Application Nos. 2000-300975 filed Sep. 29, 2000 and 2000-311229 filed Oct. 11, 2000, the contents of which are incorporated hereinto by reference.

BACKGROUND OF THE INVENTION

1. Field of the Invention

The present invention relates to a cell control method and a cell system, and in particular, to a cell control method and cell system which are characterized by a technique of collecting information on cells to which services can be provided and on non-cells to which services cannot be provided and a technique of changing a service area of an already installed base station which has a non-cell.

2. Description of the Related Art

In a mobile communication system, a service area of a base station is determined by the transmission power of a channel with which a mobile station first attempts to synchronize after searching for base stations (this channel will be hereinafter referred to as a "perch channel"). By turning on the power supply to a terminal of the mobile station in order to receive services, all terminals situated within a service area can receive signals through corresponding perch channels so as to search for base stations to which they can be connected. The transmission power of the perch channel is normally determined in advance considering the service area and the capabilities of a transmitter.

On the other hand, a transmission power control technique for individual terminals depending on various conditions such as the communication quality has been used for communication channels used for communication by users. Even with this technique introduced, the transmission power of the perch channel is fixed. Further, cells to which services are provided are fixed so that services can be stably provided to terminals within each of the cells. Before installing base stations, cells are fixed by determining the transmission power of the perch channels as well as a beam shape. Consequently, no system has been implemented which changes cell shapes according to the needs.

FIG. 17 shows a method of determining a cell for a newly installed base station. The newly installed base station determines the transmission power of its perch channel and a cell to which it provide services before starting operation. Since the cell shape is thus fixed to keep its service area from being changed, base stations are conventionally installed to increase the coverage of the service areas.

FIG. 18 shows a method of determining a cell by receiving signals through the perch channels of surrounding base stations. Before transmitting a signal through its perch channel, a base station receives signals through the perch channels of surrounding signals to predict cells covered by these stations. The base station them determines a cell to which it belongs, so as to autonomously provide services to areas that are not covered by the surrounding base stations. The base station then determines relevant transmission power and a relevant beam shape. This is a known method.

Further, in a well known method, if the base station has already been providing services and traffic is so heavy on the surrounding base stations that a great call loss may occur, the traffic is distributed by changing the cell shape of the base station as much as possible. Also in this method, the base station receives signals through the perch channels of the surrounding stations to collect information from the signals on these channels, thereby determining a cell to which the base station can provide services.

In these conventional techniques, the base station determines an area to which it provides services by receiving signals from the surrounding base stations through their perch channels.

The conventional methods, however, are essentially applicable only if signals can be transmitted between the base stations. That is, as shown in FIG. 18, when the base station determines its own cell on the basis of information from the surrounding basis stations, it must determine the cells of the surrounding base stations or receive signals indicating how the surrounding stations are providing services. If these base stations are too distant from each other to transmit signals therebetween, even if the system has a function of executing any of the conventional methods, the function is unavailable. Consequently, the cell shape of the base station disadvantageously cannot be changed.

SUMMARY OF THE INVENTION

It is thus an object of the present invention to allow each base station to change its cell even if it cannot transmit or receive signals to or from surrounding base stations.

It is another object of the present invention to provide a mobile communication system wherein if a base station is to be installed, then to determine an area to which it provides services, each location is checked to see whether it belongs to the service area by using an apparatus having functions equivalent to those of users' terminals to measure received power or the like, information on whether or not each measured location belongs to the service area is collectively managed, and even if such registration is simultaneously executed at a plurality of locations, the information on the service area can be collectively managed as a single database, so that even if an apparatus in which data is accumulated and an apparatus for detecting areas are distant from each other, results of area detection and the location information can be automatically registered and managed using second communication system.

It is yet another object of the present invention to calculate a base station the cell of which is to be changed, on the basis of the database, so that this base station can change its own cell, and to effectively use radio sources after the cell has been changed.

To attain these objects, a first aspect of the present invention provides a mobile station that can communicate with a first and a second radio communication systems, the mobile station being characterized by comprising reception means for receiving a transmitted signal from at least one base station of the first radio communication system, determination means for determining whether or not a point at which the signal has been received belongs to a cell that is a service area of the at least one base station of the first radio communication system, and transmission means for transmitting a result of the determination by the determination means to the second radio communication system.

The determination means can also make the determination on the basis of whether or not synchronization is established with a perch channel of the at least one base station of the first radio communication system.

Further, a second aspect of the present invention is characterized by comprising reception means for receiving, via a second radio communication system, a result of the determination of whether or not a mobile station that can communicate with a first and the second radio communication systems belongs to a cell that is a service area of at least one base station of the first radio communication system as well as location information on the mobile station, the result and the location information being transmitted by the mobile station, selection means for selecting a base station for which a corresponding cell of the first radio communication system is to be changed, and instruction means for instructing the base station selected by the selection means to change the cell thereof.

The selection means can also have mapping means for mapping cell and non-cell areas relating to the at least one base station of the first radio communication system, on the basis of the result received by the reception means.

Further, the selection means can have calculation means for calculating a distance between the mobile station and the at least one base station of the first radio communication system on the basis of the location information on the mobile station received by the reception means as well as location information on the at least one base station, and means for selecting a base station that is closest to the mobile station, as a target the cell of which is to be changed, on the basis of a result of the calculation by the calculation means.

Furthermore, the selection means can select a base station having the lowest utilization of radio resources, as the target the cell of which is to be changed.

The second aspect of the present invention further comprises accumulation means for accumulating the result therein which has been received by the reception means so that the result accumulated in the accumulation means can be supplied to the selection means.

A third aspect of the present invention provides a cell control method for a cell control system comprising a mobile station that can communicate with a first and a second radio communication systems and a cell forming process apparatus for instructing a base station of the first radio communication system to change a cell thereof, the method being characterized in that the mobile station receives a transmitted signal from at least one base station of the first radio communication system, determines whether or not this receiving point belongs to a cell that is a service area of at least one base station of the first radio communication system, and transmits a result of the determination to the cell forming process apparatus via the second radio communication system, and the cell forming process apparatus selects a base station for which a corresponding cell of the first radio communication system is to be changed, on the basis of the determination result transmitted by the mobile station, location information retrieved when the mobile station executes the determination process, and location information on the at least one base station of the first radio communication system, and instructs the selected base station to change the cell thereof.

The location information on the mobile station can be retrieved by the second radio communication system. Further, the location information on the mobile station can be retrieved by the at least one base station of the first radio communication system.

Further, the location information on the at least one base station of the first radio communication system can be retrieved by the cell forming process apparatus on the basis of an identifier of the base station transmitted by the mobile station together with the determination result.

A forth aspect of the present invention provides a cell control system comprising a mobile station that can communicate with a first and a second radio communication systems and a cell forming process apparatus for instructing a base station of the first radio communication system to change a cell thereof, the system being characterized in that the mobile station comprises reception means for receiving a transmitted signal from at least one base station of the first radio communication system, determination means for determining whether or not a point at which the signal has been received belongs to a cell that is a service area of the at least one base station of the first radio communication system and transmission means for transmitting a result of the determination by the determination means to the second radio communication system, and in that the cell forming process apparatus comprises reception means for receiving, via a second radio communication system, a result of the determination of whether or not a mobile station that can communicate with a first and the second radio communication systems belongs to a cell that is a service area of at least one base station of the first radio communication system as well as location information on the mobile station, the result and the location information being transmitted by the mobile station, selection means for selecting a base station for which a corresponding cell of the first radio communication system is to be changed and instruction means for instructing the base station selected by the selection means to change the cell thereof.

According to the present invention, not only base stations that can transmit and receive signals to and from surrounding signals but all the base stations can change their cells, thereby making it possible to flexibly change areas to which services can be provided. Consequently, compared to the conventional method of designing installation of base stations according to a design method based on the situation of propagation, facilities can be efficiently, while installing the base stations according to the needs. In particular, even if a spot-based service provision covering a particular area is shifted to a surface-based service provision covering all areas, the present invention enables already installed surrounding base stations to be operated more effectively than the method of installing the base stations so as to cover small areas.

Further, according to the present invention, for non-cells in which the mobile station cannot transmit or receive signals to or from the surrounding base stations, the second radio communication system is used to notify the cell forming process apparatus of non-cells, thereby enabling base station control such that the non-cells can be changed to cells.

Furthermore, due to the process of autonomously and automatically registering the results of cell/non-cell detection and the detected location information according to the present invention, information on service areas can be managed as one database, thereby enabling more efficient operation and maintenance.

A fifth aspect of the present invention provides a cell control method of controlling a cell that is a service area of each base station, the method comprising a cell determining step of receiving signals from base stations through particular channels and determining cells of the base stations depending on results of synchronization, a location information obtaining step of obtaining location information on a mobile terminal from a location information obtaining section, a location information transmitting step of transmitting results of the determination at the cell determining step and the location information to base stations with which the mobile terminal can synchronize, a distance calculating step of calculating distances between the mobile terminal and the base stations by mapping the location of the mobile terminal on the basis of the location information transmitted at the location information transmitting step, a selection step of selecting a base station that has the shortest distance as calculated at the distance calculating step, a change information transmitting step of transmitting cell change information to the base station selected at the selection step, and a change step of changing the cell of the base station on the basis of the cell change information transmitted at the change information transmitting step.

According to this method, by obtaining the results for cell determinations and the location information from the mobile terminal, the cell shape of any base station can be changed even if signals cannot be transmitted between the base stations through the perch channel.

The fifth aspect of the present invention can further comprise a storage step of storing the determination results and the location information in a storage section, and the location information transmitting step can obtain the determination results and location information for base stations with which the mobile terminal cannot synchronize, from the storage section, and transmitting the results and the location information to base stations with which the mobile terminal can synchronize. According to this method, even results of non-cell determinations are stored in the storage section and subsequently transmitted via base stations to which the mobile terminal can connect, so that data on cells to which the base station does not provide services can also be managed together with the other data.

The fifth aspect of the present invention can further comprise a reference distance calculating step of calculating reference distances on the basis of transmission power from the base stations in advance, and the selection step can select from base stations whose distances to the mobile terminal are shorter than the respective reference distances. According to this method, a base station that can be covered with a minimum transmission power can be selected from those the cells of which can be changed.

The fifth aspect of the present invention can further comprise a utilization calculating step of calculating utilization of the base stations and a utilization transmitting step of transmitting the utilization, and the selection step can select from base stations having the lowest utilization as transmitted at the utilization transmitting step. According to this method, resources can be effectively used by drastically changing the cell shapes of base stations having a low average utilization.

A sixth aspect of the present invention is a cell control system for controlling a cell that is a service area of each base station to change service areas of a mobile communication system, the system being characterized by comprising a mobile terminal including cell determining means for receiving signals from base stations through particular channels and determining cells of the base stations depending on results of synchronization, location information obtaining means of obtaining location information on a mobile terminal, and location information transmitting means for transmitting results of the determination by the cell determining means and the location information to base stations with which the mobile terminal can synchronize, and a cell control apparatus including a distance calculating means of calculating distances between the mobile terminal and the base stations by mapping the location of the mobile terminal on the basis of the location information transmitted by the location information transmitting means, selection means for selecting a base station that has the shortest distance as calculated by the distance calculating means, and a change information transmitting means for transmitting cell change information to the base station selected by the selection means, and in that the base station changes the cell thereof on the basis of the cell change information transmitted by the cell control apparatus.

According to this construction, by obtaining the results for cell determinations and the location information from the mobile terminal, the cell shape of any base station can be changed even if no signal can be transmitted between the base stations through the perch channel.

The mobile terminal can further comprise storage means for storing the determination results and the location information, and the location information transmitting means can obtain the determination results and location information for base stations with which the mobile terminal cannot synchronize, from the storage section, and transmitting the results and the location information to base stations with which the mobile terminal can synchronize.

The cell control apparatus can further comprise reference distance calculating means for calculating reference distances on the basis of transmission power from the base stations in advance, and the selection means can select from base stations whose distances to the mobile terminal are shorter than the respective reference distance. Further, the base station can comprise utilization calculating means for calculating utilization of the base stations and utilization transmitting means for transmitting the utilization, and the selection means can select from base stations having the lowest utilization as transmitted by the utilization transmitting means.

The above and other objects, effects, features and advantages of the present invention will become more apparent from the following description of embodiments thereof taken in conjunction with the accompanying drawings.

DESCRIPTION OF THE PREFERRED EMBODIMENTS

Embodiments of the present invention will be described below in detail with reference to the drawings. First, an explanation will be given of an environment having a radio communication system B covering small cells to which it provides services, and a radio communication system A covering large cells and including areas to which the system cannot provide services.

Figure 1:
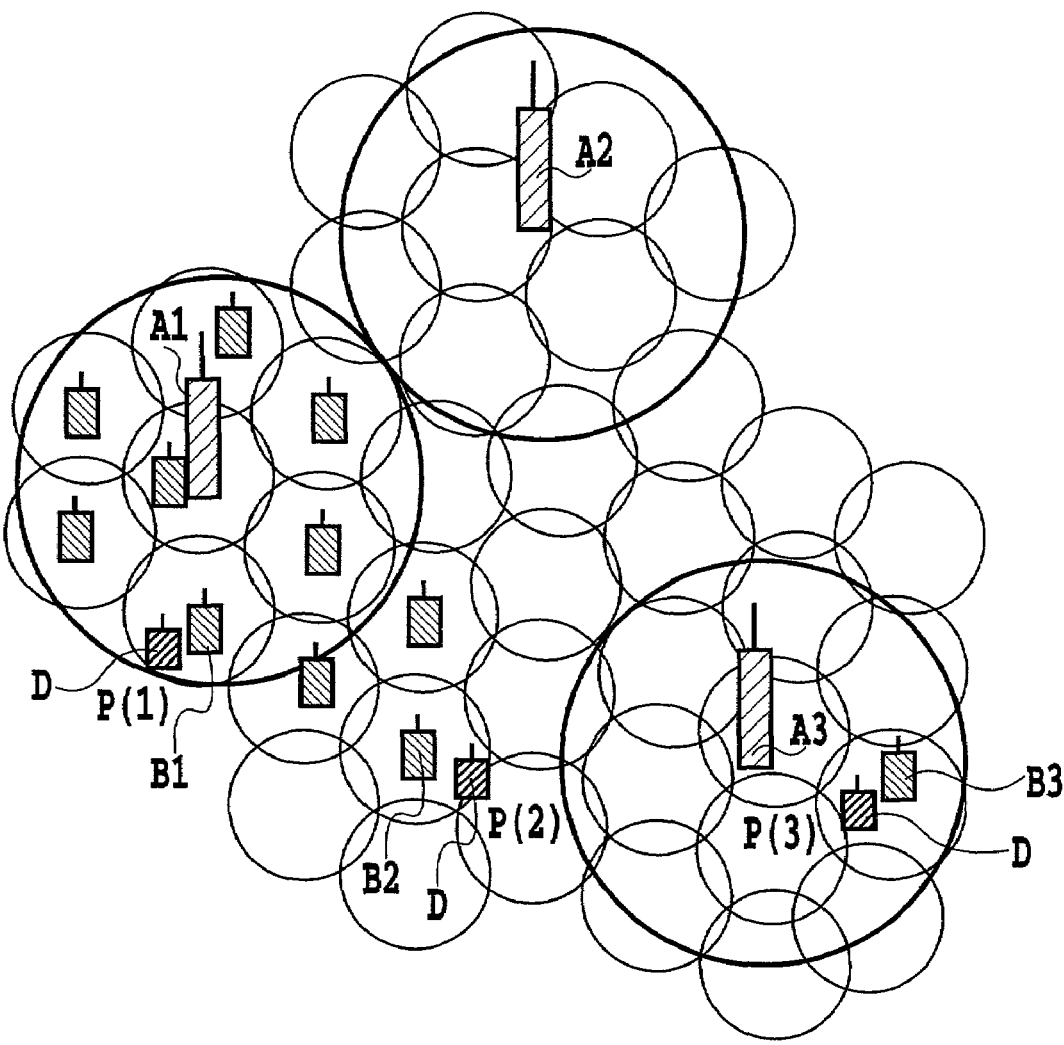
FIG. 1 is a diagram showing a configuration of cells of radio communication systems according to a first embodiment of the present invention.

FIG. 1 shows a configuration of the cells of the radio communication systems according to a first embodiment of the present invention. Larger circles denote service providing areas of the radio communication system A, while smaller areas denote service providing areas of the radio communication system B. Reference characters A1 to A3 denote base stations of the radio communication system A, reference characters B1, B2, . . . , Bn denote base stations of the radio communication system B, and reference character D denotes a terminal as a mobile station.

As shown in FIG. 1, the terminals D can each access both the base stations of the radio communication system A and the base stations of the radio communication system B, and each have a construction such as the one shown in FIG. 3, described later. If the terminal D is assumed to move a location P(1) to a location P(2) and then to a location P(3), base stations to which the mobile stations can access varies as follows: At the location P(1), the mobile station can access both a base station A1 and a base station B1. At the location P(2), the mobile station can access only a base station B2. At the location P(3), the mobile station can access both a base station A3 and a base station B3 again.

Figure 2:
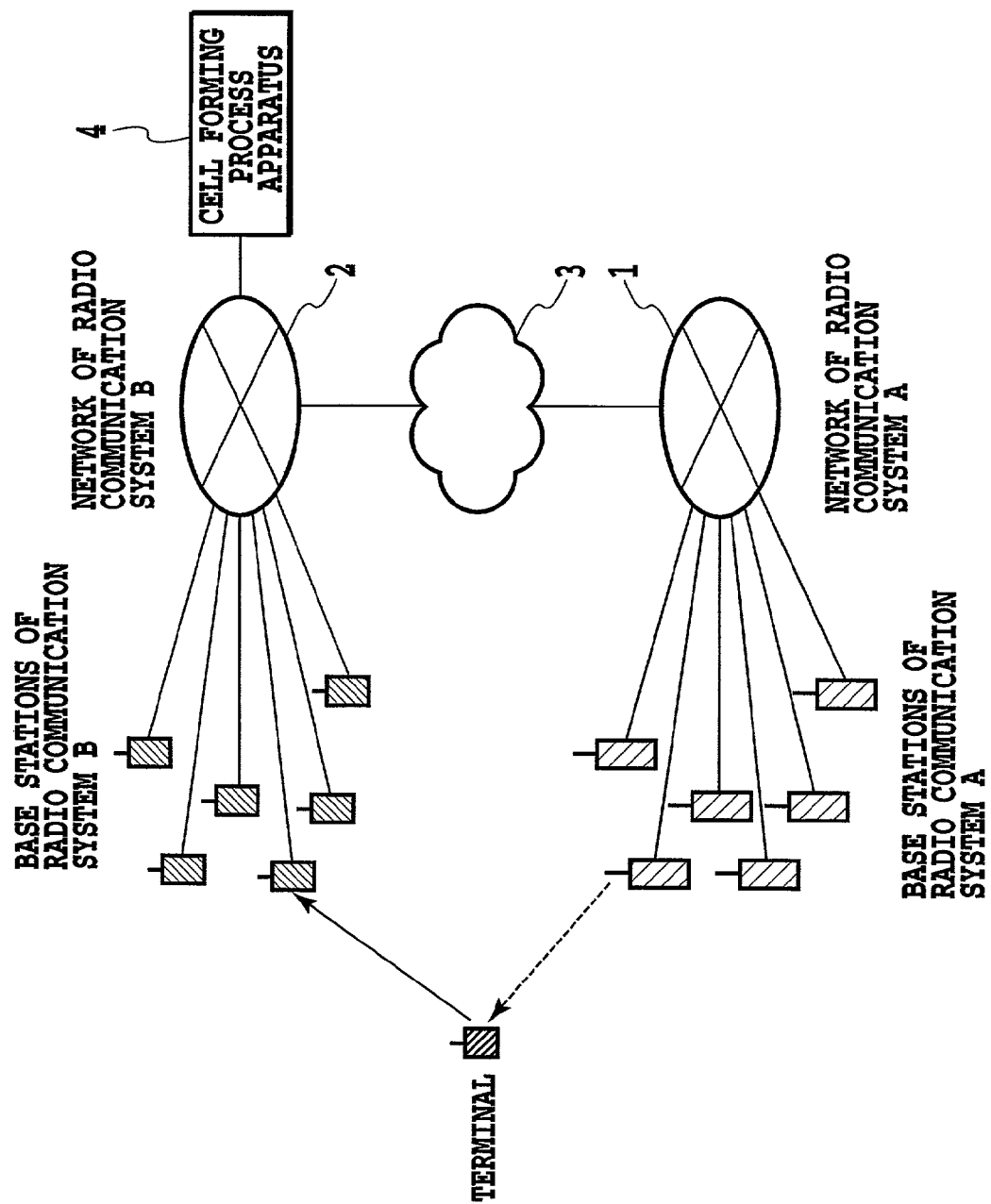
FIG. 2 is a diagram showing a construction of the radio communication systems according to the first embodiment of the present invention.
Figure 4:
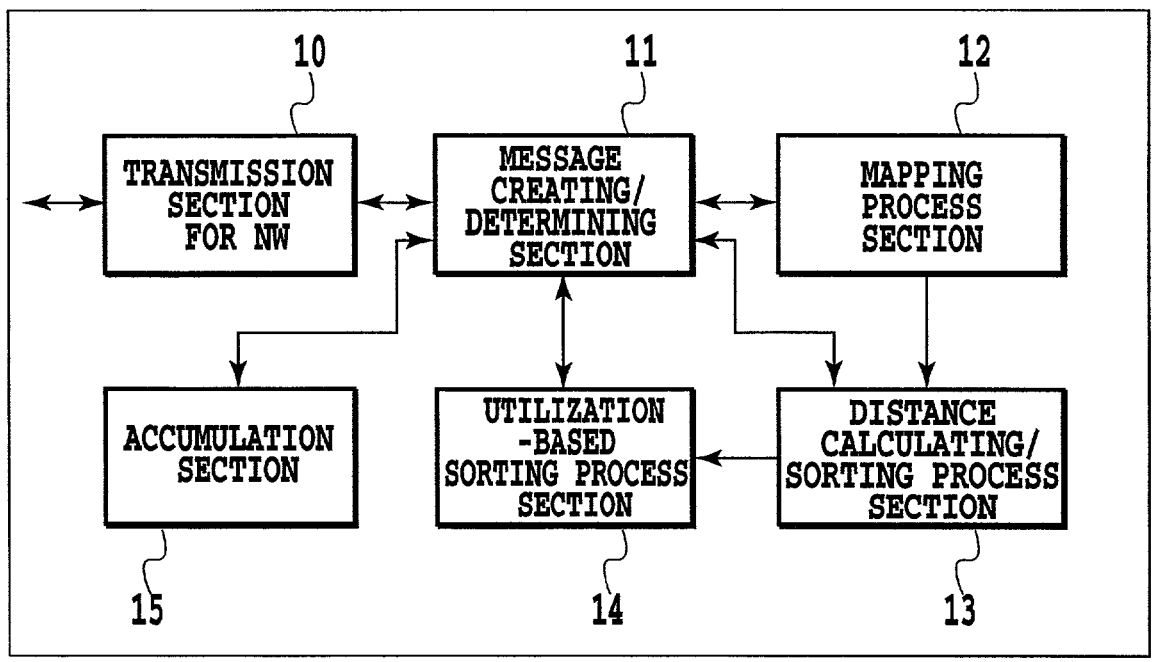
FIG. 4 is a block diagram showing a cell forming process apparatus according to the first embodiment of the present invention.
Figure 5:
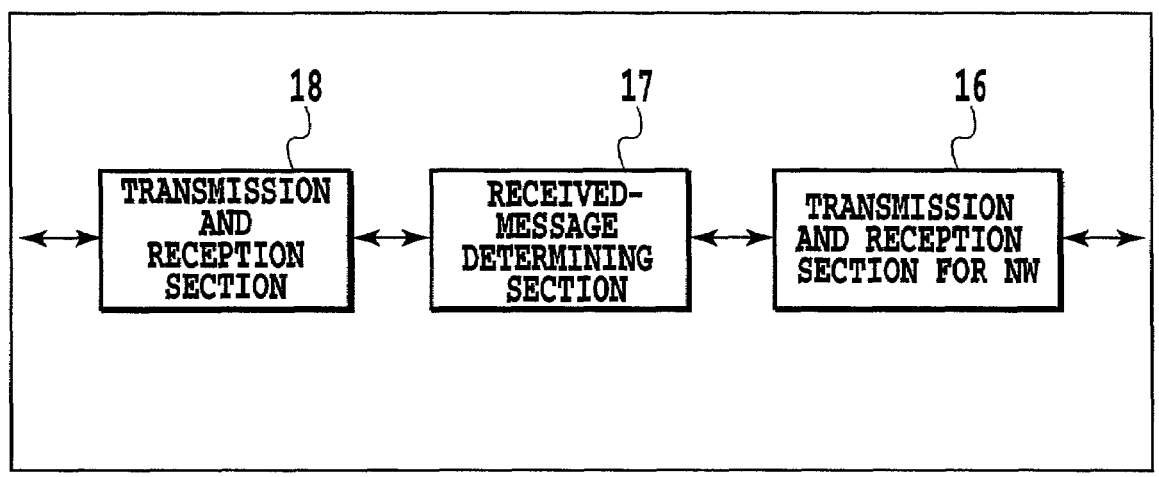
FIG. 5 is a block diagram showing a base station in a radio communication system B.

FIG. 2 shows a construction of the radio communication systems according to the first embodiment of the present invention. The radio communication systems A and B are connected to different networks 1 and 2. The networks 1 and 2 are connected to a shared network 3 so as to communicate with each other the network 3. A cell forming process apparatus 4 is connected to the network 2 to receive results of determinations for service areas of the radio communication system as retrieved by the terminal, store the results as required, execute a process as described later, and transmit information on cell shape to a base station A* (base station of the radio communication system A). The cell forming process apparatus 4 has a shared higher layer that enables communications whichever network it is connected to. A construction of the cell forming process apparatus is shown in FIG. 4. A construction of the radio communication system B in connection with the present invention is shown in FIG. 5.

Figure 3:
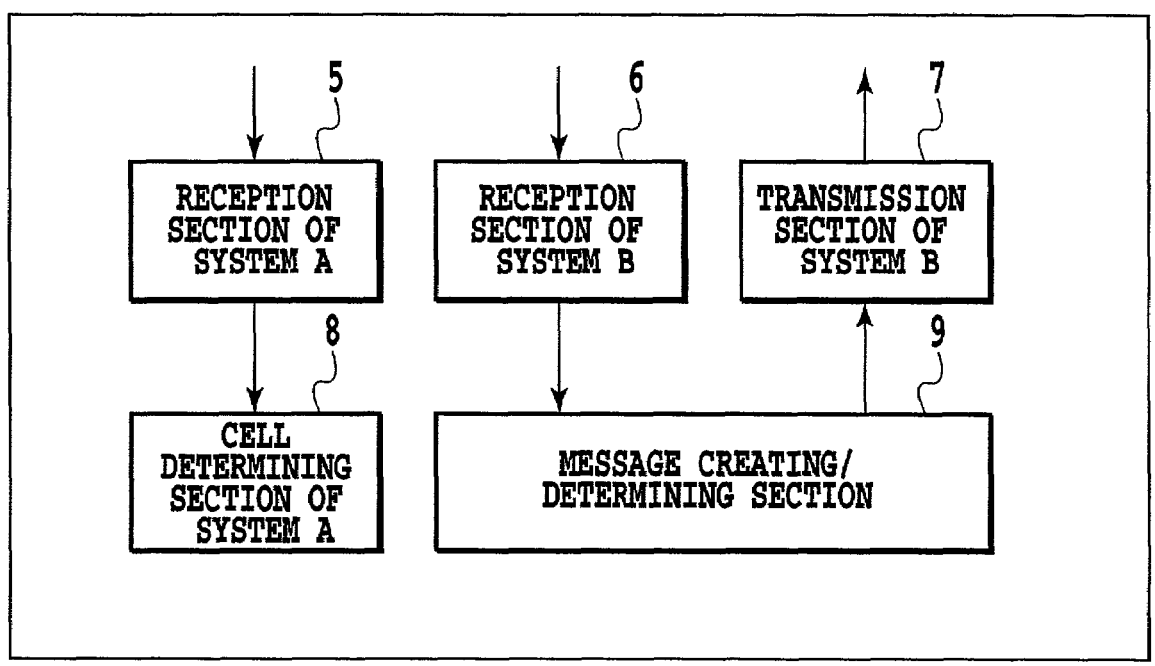
FIG. 3 is a block diagram showing a construction of a terminal according to the first embodiment of the present invention.

FIG. 3 shows a construction of the terminal according to the first embodiment of the present invention. The terminal has a reception section 5 for receiving signals used in the radio communication system A, a reception section 6 for receiving signals used in the radio communication system B, a transmission section 7 for transmitting signals used in the radio communication system B, and a cell determining section 8 for the radio communication system A which make determination as described later on the basis of signals from the reception section 5.

Further, as described later in more detail, the terminal has a message creating/determining section 9 for creating messages that results of determinations on the basis of a signal from the cell determining section 8 and analyzing a signal from the reception section 6 to obtain location information on the terminal when receiving a terminal location retrieving service from the radio communication system B. The functions of the cell determining section 8 and the message creating/determining section 9 are implemented, for example, by a CPU provided in the terminal, by executing a corresponding program stored in a system memory provided in the terminal.

FIG. 4 shows a construction of the cell forming process apparatus according to the first embodiment of the present invention. The cell forming process apparatus 4 has a transmission and reception section 10 for transmitting and receiving signals to and from the network 2, to which the cell forming apparatus 4 is connected. As described later in further detail, the message determining/creating section 11 analyzes a message (for example, the determination results from the terminal, the identifier of the base station, or the like), and creates a message for instructing the cell to be changed, on the basis of a signal from a utilization-based sorting process section 14 and a distance calculating/sorting process section 13. Furthermore, the determination results or the like are stored in an accumulation section 15.

A mapping process section 12 maps the location of the terminal, the location of the base station A*, and the like on the basis of a signal from the message determining/creating section 11. The distance calculating/sorting process section 13 calculates the distance between surrounding base stations and the terminal on the basis of a signal from the message determining/creating section 11 or the mapping process section 12, and sorts the base stations in the ascending order of the distance.

The utilization-based sorting process section 14 sorts the base stations in the ascending order of traffic on the basis of the results of the process by the distance calculating/sorting section 13, traffic information on the surrounding base stations, and the like, to select a base station that has the least traffic. The message determining/creating section 11, the mapping process section 12, the distance calculating/sorting process section 13, and the utilization-based sorting process section 14 can be constituted, for example, by a computer system. In this case, the functions of these sections can be implemented by a CPU provided in this computer system, by executing corresponding programs stored in a system memory provided in the system.

FIG. 5 shows a construction of a base station of the radio communication system B. The base station has a transmission and reception section 16 for transmitting and receiving signals to and from the network 2, a received-message determining section 17 for analyzing signals (messages) received by the transmission and reception section 16, and a transmission and reception section 18 for supplying the received signal to the received-message determining section 17 and transmitting signals from the received-message determining section 17, the transmission and reception section 18 including an antenna.

Figure 6:
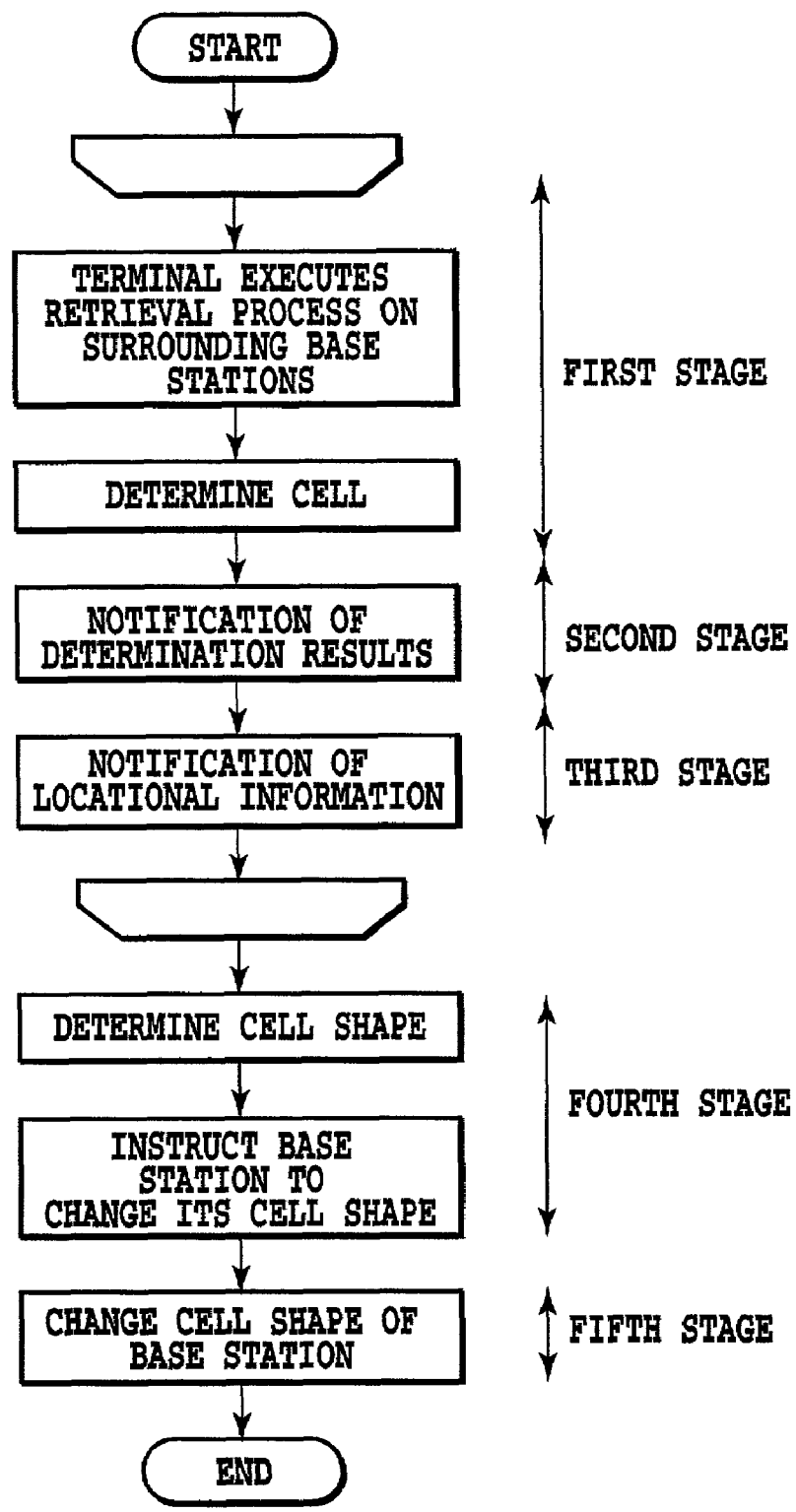
FIG. 6 is a chart showing a cell control method according to the first embodiment of the present invention.

FIG. 6 shows a cell control method according to the first embodiment of the present invention. The flow of this process is roughly divided into five stages as shown below.

(1) Determination of whether or not the terminal belongs to an area to which the base station A* provides services (2) Notification to (accumulation in) the cell forming process apparatus on the network (3) Accumulation of location information on the terminal and base station A*

(4) Determination of the cell shape based on the location information on the terminal and the base station A* as well as the results of area determinations (5) Change of the cell shape.

First, the terminal executes a retrieval process on the surrounding base stations for a fixed time. If the retrieval results in detection of one or more base stations to which the terminal can connect, the terminal determines that it belongs to the cells of these base stations. On the other hand, if no base station to which the terminal can connect is detected within a fixed time, the terminal determines that it does not belong to a cell. The terminal notifies the cell forming process apparatus connected to the network of results for cell/non-cell determination. Further, it also transmits the location information on itself and the information on the base stations the cells of which have been determined to cover the terminal, to the cell forming process apparatus.

The above first to third steps are executed once, and as a result, it is determined that the cell shape of a certain base station is to be changed. The contents of the determination are communicated to the base station, which then changes its cell.

The processing executed at steps (1) to (5) will be described below in detail.

(1) First Stage: Determination of Whether or not the Terminal Belongs to an Area to which the Base Station A* Provides Services The terminal attempts to synchronize with a perch channel through which a signal is transmitted by the base station A*, to determine whether or not it can receive signals through this channel. Once the synchronization is established to indicate that the terminal can receive signals through this perch channel, it determines that it belongs to the cell to which the base station A* provides services. Further, it can receive signals through the perch channels of a plurality of base stations. On the other hand, if the terminal cannot synchronize with the perch channel of the base station A* even after a fixed time and thus fails to receive a signal through this channel, it determines that it does not belong to the cell.

To achieve these determinations, the cell determining section 8 retrieves all frequencies and transmission timings used by the perch channel of the base station A*. Accordingly, if the perch channels of the radio communication system consist of different frequency zones, the terminal retrieves all the relevant frequencies. If the perch channels of the radio communication system use different timings for transmissions thereon, the retrieval process is executed for a time equal to or longer than the transmission period of any of the perch channels. Further, for a system in which the perch channels are formed using a special spreading code such as in CDMA, the terminal executes retrieves the spread code used by the perch channel.

A timing for the determination, that is, a trigger with which the cell determining section 8 retrieves the base station A* may be one of the following: ① The terminal uses a man machine interface to input a retrieval start signal to the reception section 5 of the system A in a hardware or software manner. ② On receiving a retrieval start signal from the radio communication system B as described later, the terminal receives repeats the retrieval at fixed intervals until it receives a retrieval end signal. ③ The cell forming process apparatus transmits a retrieval start signal, and the terminal receives this signal and executes the retrieval according to an instruction from the cell forming process apparatus.

Figure 7:
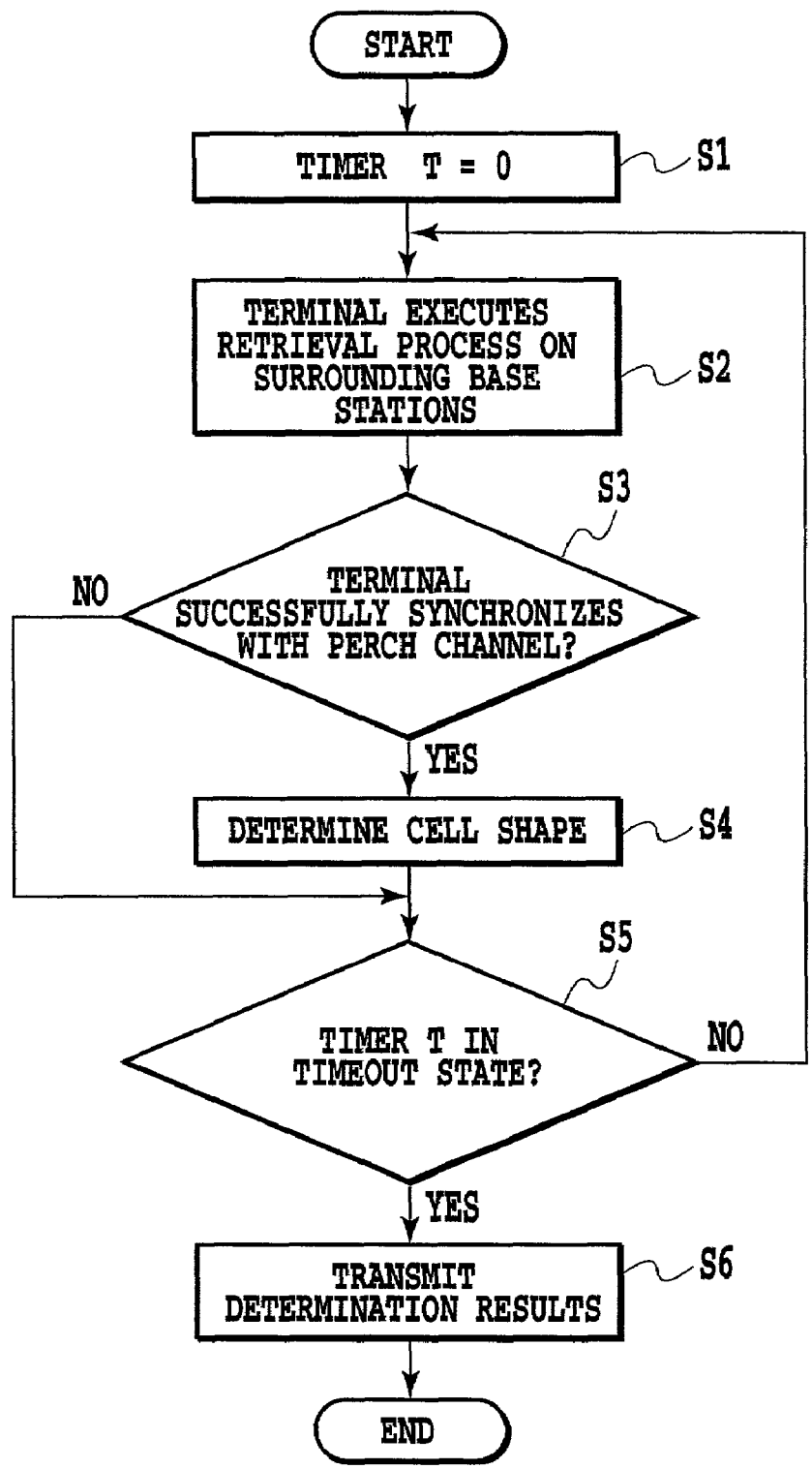
FIG. 7 is a flow chart showing a process executed by the terminal according to the first embodiment of the present invention.

FIG. 7 shows a process executed by the terminal according to the first embodiment of the present invention. The first stage includes process steps S1 to S5. First, at step S1, a timer T is reset (set to zero). The timer T indicates a time for which the terminal executes the retrieval on the base station; the terminal executes the retrieval for the time T per retrieval instruction. At step S2, the terminal starts the retrieval process on the surrounding base stations. The retrieval process comprises attempting to synchronizing with the perch channel through which the base station transmits signals. The terminal retrieves all the frequencies used by the perch channels of the radio communication system A. Further, the terminal executes the retrieval for a time longer than the transmission period of the perch channel, for each frequency. Thus, the timer T required for the retrieval may be set at such a larger value that a condition required for the synchronization can be met, for example, a synchronization code can be consecutively found K times (transmission period of the perch channel×K×the number of frequencies at which signals can be transmitted through the perch channel).

At step S3, the terminal determines whether or not it has established synchronization with the perch channel. If it determines that it has established the synchronization, it then determines at step S4 that that the measured location belongs to the cell of the base station that has transmitted the signal through the perch channel. At step S5, the terminal determines whether or not the timer T is in a timeout state. If the timer T is not in the timeout state, the process returns to step S2. If the timer is in the timeout state, the terminal transmits the determination result at step S6.

If the terminal determines at step S3 that it cannot synchronize with the perch channel, the process proceeds to step S5, where it continues the retrieval process for the time T. The retrieval process can be executed on one or more base stations within the time T. Once the timer T is brought into the timeout state, if the terminal has completed synchronization with the perch channel of any base station, the terminal determines that it belongs to the cell of this base station. If the terminal has not established synchronization, the terminal determines that it does not belong to a cell. The terminal transmits a plurality of determination results at a time after the timeout at step S6. Before the transmission section 7 executes the transmission, the message creating/determining section 9 adds information including the identifiers of the base stations and the identifier of the transmitting terminal to the determination results (cell/non-cell).

(2) Second Step: Notification to the Cell Forming Process Apparatus on the Network As described above, the terminal notifies the cell forming process apparatus connected to the network of the determination results via a base station B* (base station of the radio communication system B) (step S6 in FIG. 7).

On the other hand, if the terminal can communicate with the base station A* in an area to which the base station A* provides services, it can notifies the cell forming process apparatus 4 connected to the network, via the base station A*, but in this case, the notification is carried out only if the terminal determines that it belongs to a cell. That is, locations for which no determination results are communicated can be considered to be not in cells. The cell/non-cell determination, however, is less accurate than in the notification via the base station B*. By repeating the cell/non-cell determination process, information on the cell/non-cell determination for the base station A can be accumulated in the cell forming process apparatus 4 as a database.

(3) Third Step: Notification (Accumulation) of Location Information on the Terminal and Base Station A*

The cell forming process apparatus 4 causes the message determining/creating section 11 to analyze a received signal (message) to obtain cell/non-cell determination information on the base station A*, and also obtains information on the location where the determination was executed, as described later. That is, the location where the determination was executed and the determination results are correlated with each other on a one-to-one basis. Furthermore, these pieces of information are accumulated in the accumulation section 15.

Specifically, on transmitting the information on the results for cell determination, the terminal treats a signal for the determination results equivalently to a terminal location registration signal. On receiving the signal, the base station B* simultaneously transmits it to an apparatus that registers and manages the location information. Required location information includes the ① location information on the terminal and the ② location information on the base station A*. Since the location information on the terminal gives the knowledge of the location where the cell/non-cell determination was executed for the base station A, the mapping process section 12 can execute mapping. Further, the location information on the base station A* is required in order to select a base station suitable for enlargement by the cell forming process apparatus 4 of the area to which the base station provides services and to transmit a signal to the selected base station instructing it to change the area. These pieces of location information are provided to the mapping process section 12 together with the determination results for mapping.

① Method of Transmitting the Location Information on the Terminal

The method of transmitting the location information on the terminal can be implemented using a location retrieving service, described below. Here, two variations will be shown.

(i) Variation in which the radio communication system B provides a location retrieving service
(ii) Variation in which the base station A* provides a location retrieving service First, the variation (i) will be described in detail. The location information on the terminal is obtained by directly using such a location retrieving service as provided by a PHS (Personal Handyphone System). Accordingly, the radio communication system B in this variation preferably can simultaneously provide a radio access communication service and a location retrieving service, as in PHS. The use of the location retrieving service of the PHS allows the cell forming process apparatus to obtain the location information on the terminal. In this case, however, the cell forming process apparatus calls the terminal to request it to notify the apparatus of the location. Accordingly, to automatically call terminals of the PHS, the cell forming process apparatus has a timer for instructing the base station A* to start or end the cell/non-cell determination and periodically makes an automatic call, and a man machine interface for setting the timer. An apparatus independent of the cell forming process apparatus can also makes a call. In this case, this apparatus must transmit the location information on the terminal to the cell forming process apparatus. The terminal uses the reception section 6 to receive this call signal, uses the message creating/determining section 9 to analyze the signal, and uses the transmission section 7 to transmit the location information on the terminal.

Now, the variation (ii) will be described in detail. It is assumed that the base station A* is a system capable of providing the location retrieving service, and that the network of the radio communication system A can manage the location information on terminals capable of communicating with the base station A*. In this case, before analyzing the cell of the base station A*, the terminal transmits the location registration signal to the base station A* so that the time of the determination coincides with the time of the location retrieval. That is, if the terminal transmits the location information, the location of the terminal is registered at the time of the determination, and the location where the determination was executed and the determination results are correlated with each other on a one-to-one basis.

② Method of Transmitting the Location Information on the Base Station A*

Next, a variation in which the terminal transmits the identifier of the base station A* to the cell forming process apparatus 4 will be shown as a method of notification of the location information on the base station A*. Before transmitting the determination results to the cell forming process apparatus 4, the terminal recognizes the identifier of the base station A* transmitted through the perch channel and transmits it together with the determination results. After the message determining/creating section 11 has identified the identifier from the signal received by the transmission/reception section 10, the cell forming process apparatus 4 has a table for managing the identifier and the location of the base station A*, and determines the location of the base station A* by retrieving this table. When a base station A* is newly install, it is registered and the table is updated. Furthermore, if the terminal is determined to be not in a cell that is not an area to which services are provide, it does not transmit the identifier or transmits a zero identifier so that the message determining/creating section 11 of the cell forming process apparatus 4 can identify the determination results.

Repeating the process from the first to third stage, shown in FIG. 6, causes cell/non-cell data to be sequentially accumulated in the accumulation section 15 of the cell forming process apparatus 4. The number of cell changes required decreases with an increase in the number of these repetitions. On the contrary, the number of cell changes required increases with a decrease in the number of these repetitions. A reference (corresponding to, for example, the contents of ② and ③ in "Process of retrieving base stations subjected to changes" in the description of (4) Fourth step: Determination of the cell shape, described later)

is provided which is used to determine whether or not the cell is to be changed after the repetition process so that the cell can be changed when the corresponding value is equal to or more than the reference. This serves to avoid unwanted cell changes to reduce system loads.

The necessity of the cell change may be determined whenever the process from the first to three stages is executed (for example, see "Trigger to change the cell shape" in the description of (4) Fourth stages: Determination of the cell shape, described later). In this case, the cell can be promptly changed in response to a change in environments. Since, however, the information for the determination comprises the results of a single measurement, the determination is less accurate than in the repetition process.

(4) Determination of the Cell Shape

In the present invention, on the basis of the location information on the terminal and base station A* and the results of area determinations, the cell shape of the base station A* is changed as required to always form a proper cell, thereby improving the quality of the services. An example of the fourth stage will be described below in detail.

(Trigger to Change the Cell Shape)

To implement the process of changing the cell shape, a trigger and a timing used to determine the necessity of the change must be clarified. In this embodiment, the change is triggered when the terminal cannot synchronize with the perch channel of the base station A*, that is, when the terminal determines that it does not belong to a cell. If the terminal can synchronize with the perch channel, this means that it can be connected to the base station. If the terminal can be connected to the base station, then it can immediately determine that it is within the cell of the base station. The process flow executed by the terminal is as shown in FIG. 7.

(Process of Retrieving Base Stations to be Subjected to Changes)

On the basis of the notification of the determination results from the terminal, the cell forming process apparatus 4 retrieves base stations to be subjected to changes in order to determine a base station for which the cell shape is to be changed. This retrieval process is executed ① each time a result for non-cell determination is received, ② when a change from notification of a non-cell to notification of a cell has occurred N times, or ③ when notification of a non-cell has been consecutively received M times.

The selection of a base station to be subjected to a change depends on the distances between a location (P) that is to become a new cell and surrounding base stations. That is, the transmission power of the perch channel of the base station has a maximum value, and it is physically difficult to increase the transmission power beyond this value. Thus, a cell covered by the maximum transmission power corresponds to a maximum value of the cell that can be supported by the base station.

Figure 8:
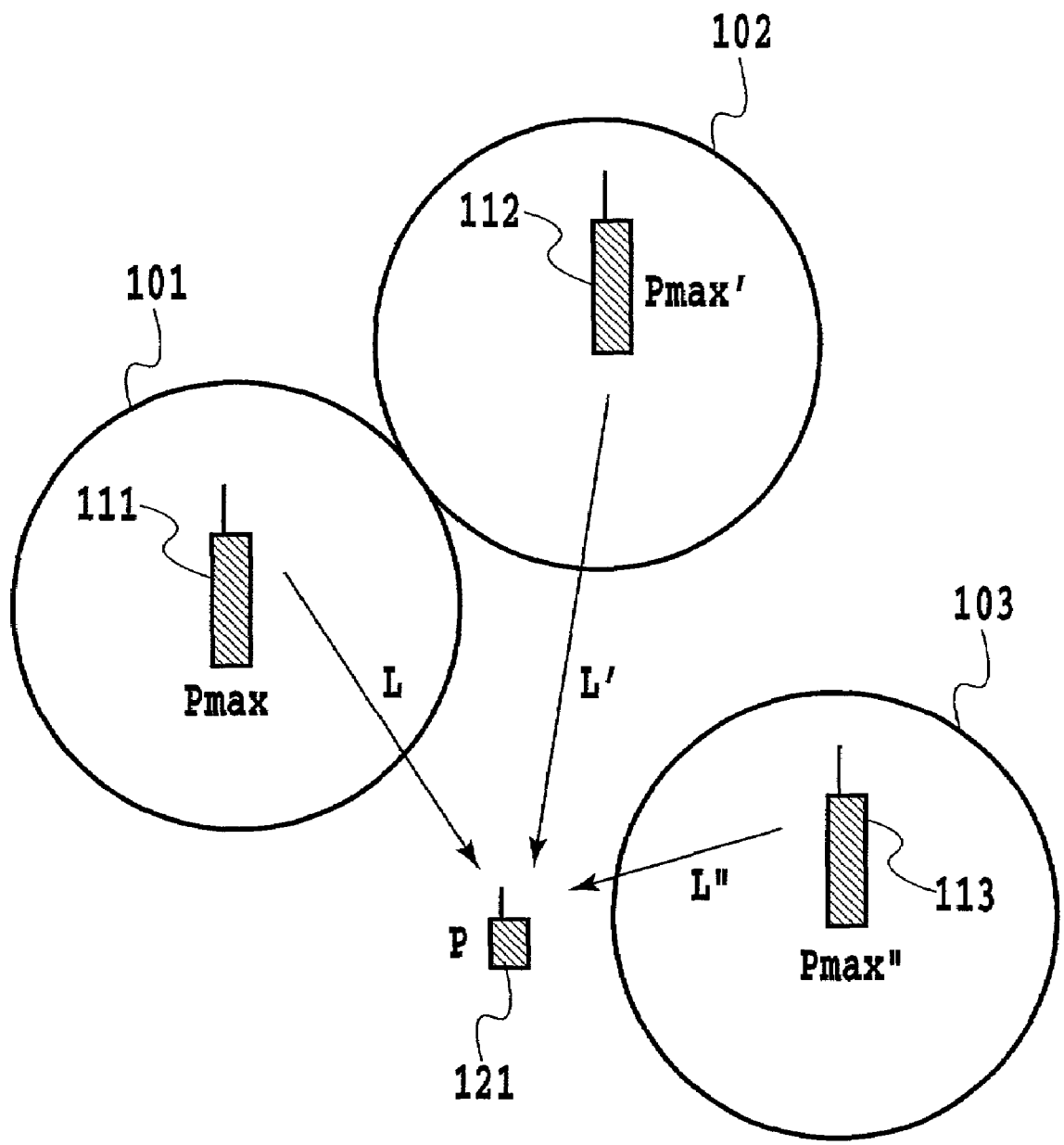
FIG. 8 is a diagram illustrating the relationship between transmission power from base stations and the distances thereto in the cell control method according to a variation of the first embodiment of the present invention.

FIG. 8 shows the relationship between the transmission power from the base station and the distance to the base station in the cell control method according to a variation of the first embodiment of the present invention. The distances between the location P of a mobile station 121 and surrounding base stations 111 to 113 are defined as L, L', and L", respectively. The maximum values of the transmission power from the base stations 111 to 113 are defined as Pmax, Pmax', and Pmax", respectively. Further, the maximum values of cells that can be formed by maximum transmission power are defined as Lmax, L'max, and L"max, respectively, and are called "reference distances". The cell forming process apparatus retrieves base stations that meet:

$$L \leq L_{max}$$

$$L' \leq L'_{max}$$

$$L'' \leq L''_{max}$$

and then sets the base stations obtained as candidates for changes. The cell forming process apparatus further selects one of the candidate base stations for changes which is closest to the location P of the mobile station 121, and then changes the cell thereof. This corresponds to the selection of the base station that can be covered by the minimum transmission power. This process is executed by the distance calculating/sorting section 13.

Furthermore, specific methods of selecting one of the candidate base stations for changes include the following:

a. The cell of the base station closest to the location P is enlarged. That is, the base station that can be covered by the minimum additional power is selected.

b. The cells of base stations with a low traffic, that is, base stations to which only a small amount of service are being provided, is enlarged. That is, the resource utilization of each base station is averaged over a fixed time so that the cells of base stations with a low average utilization are enlarged, thereby effectively using radio resources.

(Procedure of the Process Executed by the Cell Forming Process Apparatus)

Figure 9:
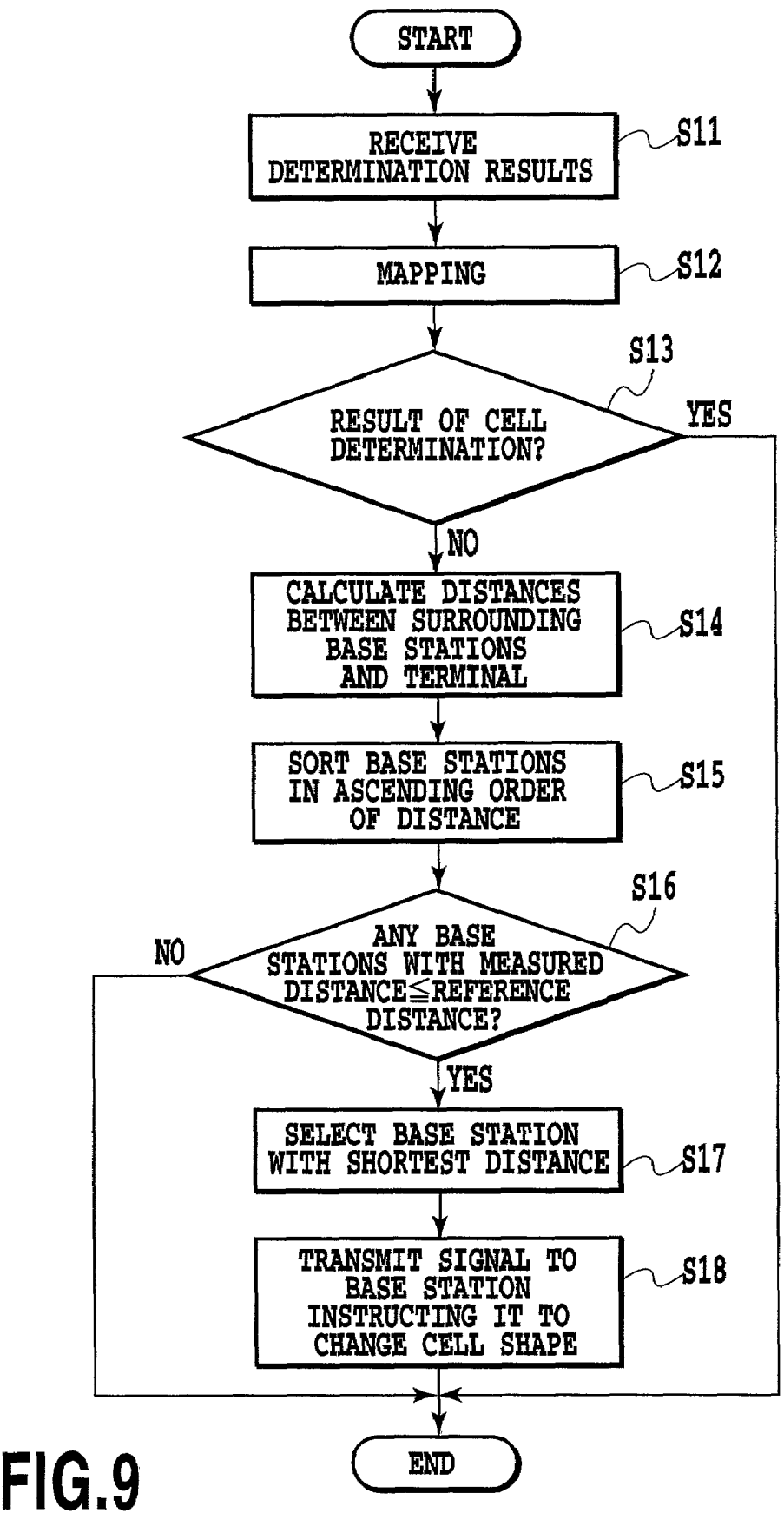
FIG. 9 is a flow chart showing a first example of control for the cell forming process apparatus according to the variation of the first embodiment of the present invention.

An example of an operation of the cell forming process apparatus including the specific variation of the selection of base stations to be subjected to changes will be described with reference to FIGS. 9 and 10. FIG. 9 shows an example of control executed by the cell forming process apparatus according to the variation of the first embodiment the present invention. First, at step S11, the cell forming process apparatus receives results for cell/non-cell determination transmitted by the terminal (this process is executed by the transmission and reception section 10 and the message determining and creating section 11). This example employs the above described method by which the process of retrieving base stations to be subjected to changes is started each time a result for non-cell determination is received.

Next, at step S12, the mapping process section 12 maps the received results. At this time, as described for the third stage, the information on the location where the determination was executed is required. At step S13, the cell forming process apparatus determines whether or not the determination results indicate that the terminal belongs to the cell. If the determination results indicate that the terminal belongs to the cell, the process is not particularly required and is thus ended. On the other hand, if the determination results indicate that the terminal does not belong to a cell, the process of changing the cell shapes of surrounding base stations is required, so that the process proceeds to step S14. At this step, the distance calculating/sorting process section 13 selects surrounding base stations from the mapping provided by the mapping process section 12, and calculates the distances between each of these base stations and the terminal that has transmitted the determination results. These distances are called "measured distances". At step S15, on the basis of the results of the calculation, the cell forming process apparatus sorts the base stations in the ascending order of the measured distance.

At step S16, the cell forming process apparatus compares the measured distances with the corresponding reference distances to determine whether or not the measured distances of base stations are shorter than their reference distances. If the measured distances of the base stations are shorter than their reference distances, these base stations are extracted as candidates for changes, and the process proceeds to step S17. At this step, the utilization-based sorting process section 14 selects one of these candidates as one to be subjected to a change. Finally, at step S18, the cell forming process apparatus transmits a signal to the selected base station instructing it to change its cell.

Figure 10:
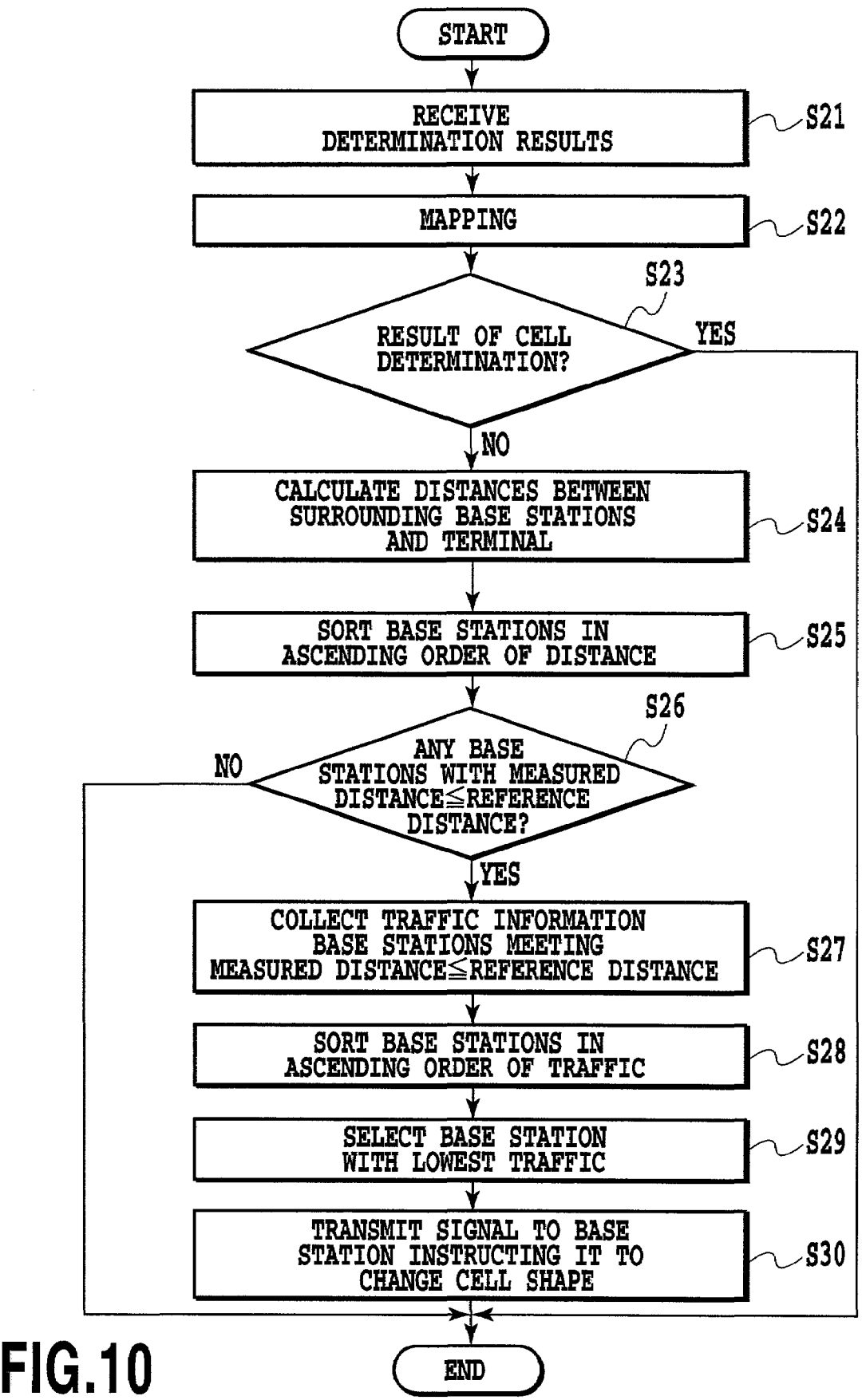
FIG. 10 is a flow chart showing a second example of control for the cell forming process apparatus according to the variation of the first embodiment of the present invention.

FIG. 10 shows an example of control executed by the cell forming process apparatus according to the variation of the first embodiment of the present invention. This example employs the method of the process b of retrieving base stations to be subjected to changes. In this case, the process of comparing the measured distances with the reference distances (steps S21 to S26) is the same as process steps S11 to S16 in FIG. 9.

If there are any candidate base stations for changes, then at step S27, the cell forming process apparatus collects their average utilizations over a fixed time from the information accumulated in a memory in the cell forming process apparatus 4. At step S28, the cell forming process apparatus sorts the base stations in the ascending order of the average utilization, and at step S29, selects one of the base stations which has the lowest average utilization, as the one to be subjected to a change (this process is executed by the utilization-based sorting process section 14). Finally, at step S30, the cell forming process apparatus transmits a signal to the selected base station instructing it to change its shape (this process is executed by the message creating/determining section 11).

The average utilization, which is required in this case, may be transmitted by each base station directly to the cell forming process apparatus according to a fixed cycle, or may be transmitted to the perch channel so that the terminal can subsequently transmit it to the cell forming process apparatus together with the determination results.

(5) Fifth Stage: Change of the Cell Shape

The process of instructing the base station to change its cell comprises providing the base station with the contents of the change. In this case, the cell shape of the base station can be changed by providing the base station with instructions for a direction and the transmission power. If the base station uses a sector antenna or an adaptive antenna, the instruction for the direction is necessary. If the base station uses the sector antenna, a sector number can be provided. If the base station uses the adaptive antenna, a beam shape based on an estimated changed cell shape is calculated using a typical signal process algorithm for adaptive antennas so that an instruction for this beam shape can be provided to the base station.

Figure 11:
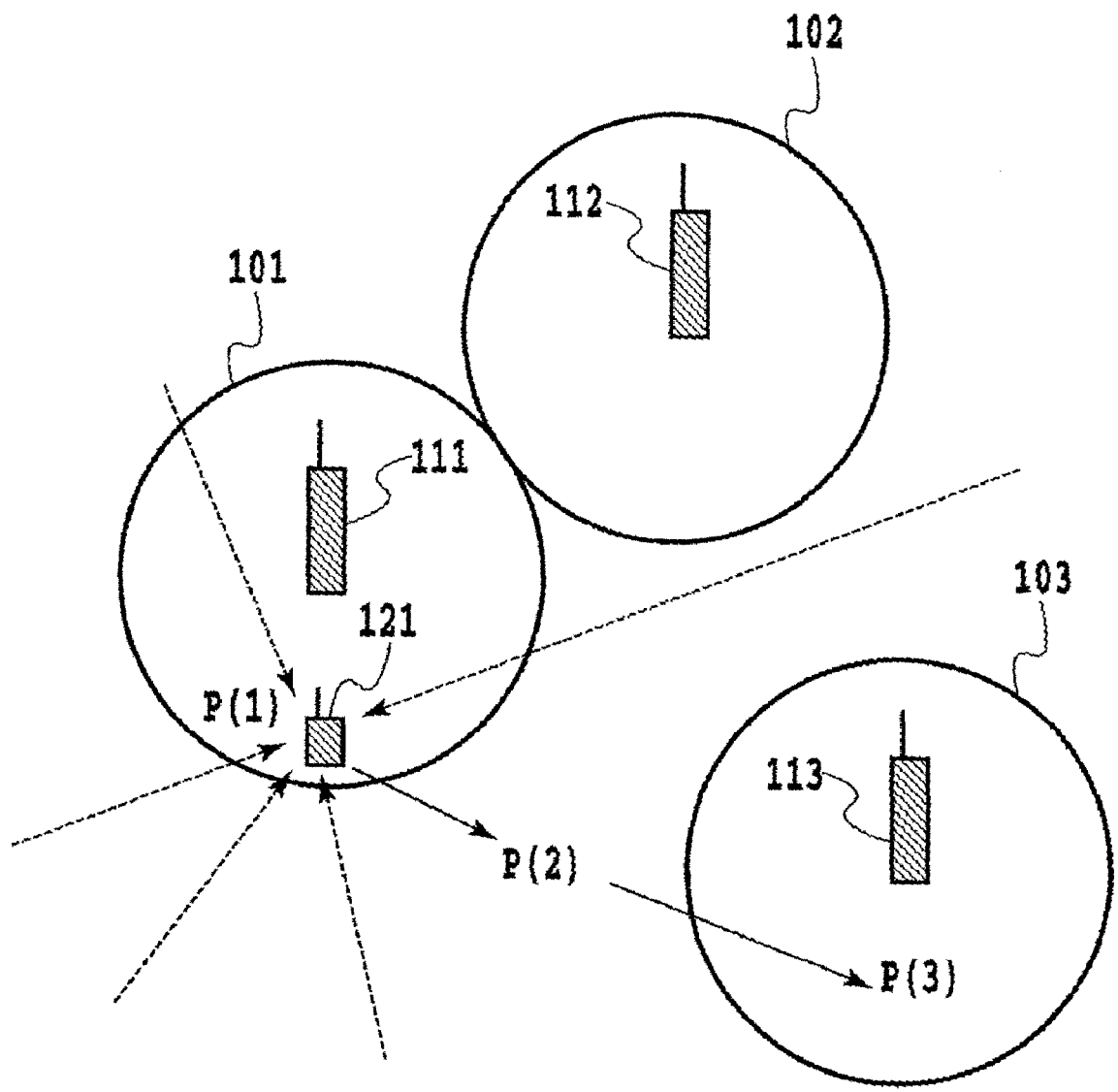
FIG. 11 is a diagram showing a configuration of cells of a radio communication system according to a second embodiment of the present invention.

Next, an explanation will be given of the case of only a radio communication system with large cells including areas to which services cannot be provided. FIG. 11 shows a configuration of cells in a radio communication system according to a second embodiment of the present invention. In this mobile communication system, the base stations 111 to 113 have cells 101 to 103 to which they can provide services, and a mobile terminal 121 can communicate with the base stations 111 to 113. Further, the mobile terminal 121 receive positioning signals from the GPS (Global Positioning System) to obtain location information.

When the mobile terminal 121 moves from a location P(1) to a location P(2) and then to a location P(3), it alternates between a cell, in which it can be provided with services, and an area in which it cannot be provided with services. At the location P(1), the mobile terminal 121 can access the base station 111. At the location P(2), the mobile terminal can access none of the base stations. At the location P(3), the mobile terminal 121 can access the base station 113. On the other hand, the mobile terminal 121 can obtain location information at any of the locations P(1), P(2), and P(3) using the GPS.

Figure 12:
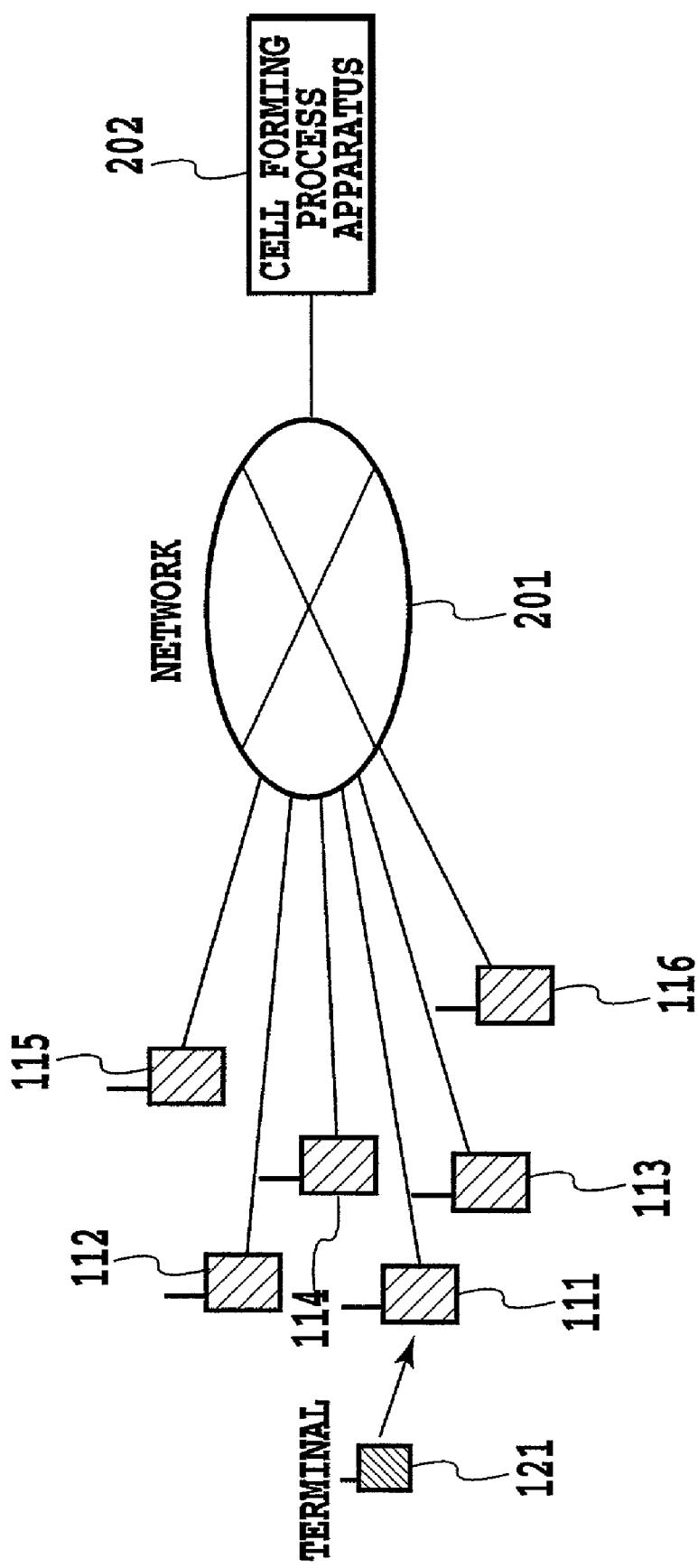
FIG. 12 is a diagram showing a construction of the radio communication system according to the second embodiment of the present invention.

FIG. 12 shows a construction of the radio communication system according to the second embodiment of the present invention. A plurality of base stations 111 to 116 are connected to a network 201, and a cell control apparatus 202 for controlling the cells of the base stations 111 to 116 is connected to the network 201. The cell control apparatus 202 and the mobile terminal 121 each have an application for communication. The cell control apparatus 202 accumulates the results for cell determination for the base station 111, which has been accessed by the mobile terminal 121, and transmits the signal for cell change to the base station on the basis of the results for cell determination.

Figure 13:
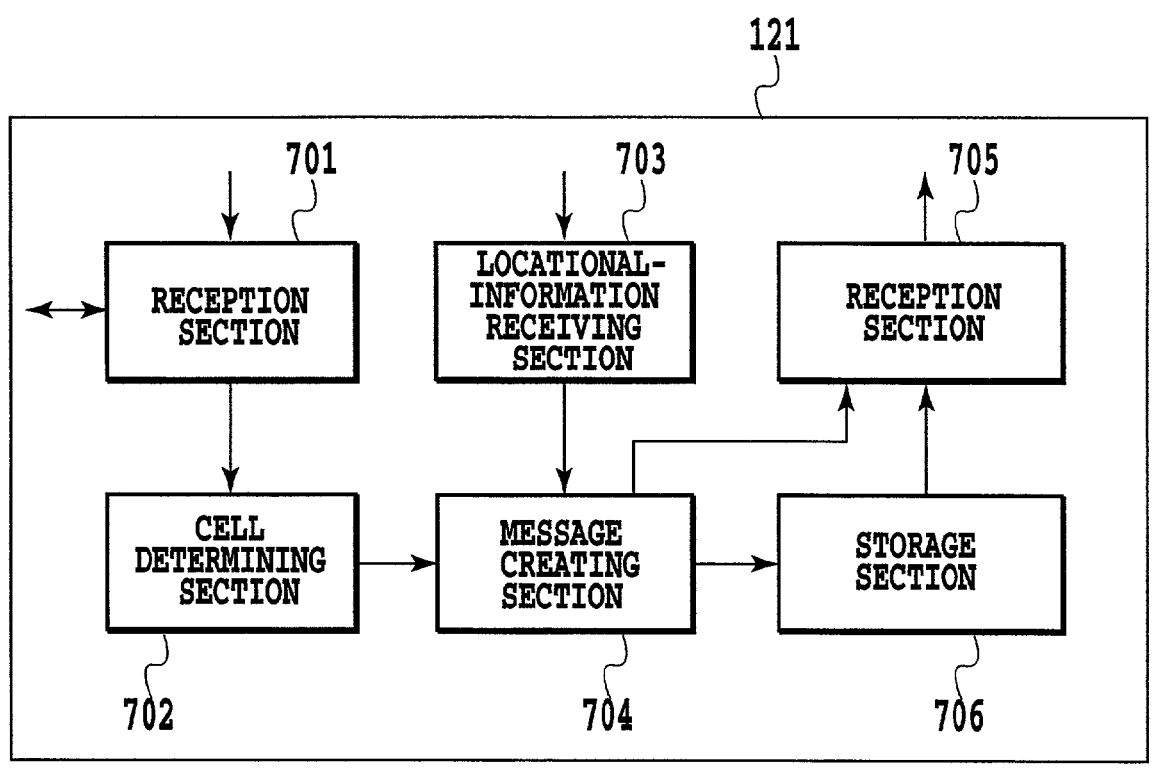
FIG. 13 is a block diagram showing a mobile terminal according to the second embodiment of the present invention.

FIG. 13 shows a construction of the mobile terminal according to the second embodiment of the present invention. The mobile terminal 121 comprises a reception section 701 for receiving signals from the base stations through their perch channels, a cell determining section 702 for establishing synchronization with each perch channel and determining whether or not a signal can be received through this channel, a location information receiving section 703 for receiving positional signal from the GPS to calculate location information, a message creating section 704 for creating a message to be transmitted to a cell control apparatus, on the basis of the determination results from the cell determining section 702 as well as the location information from the location information receiving section 703, a transmission section 705 for transmitting the message created by the message creating section 704, to the cell control apparatus, and a storage section 706 for accumulating messages created by the message creating section 704.

Figure 14:
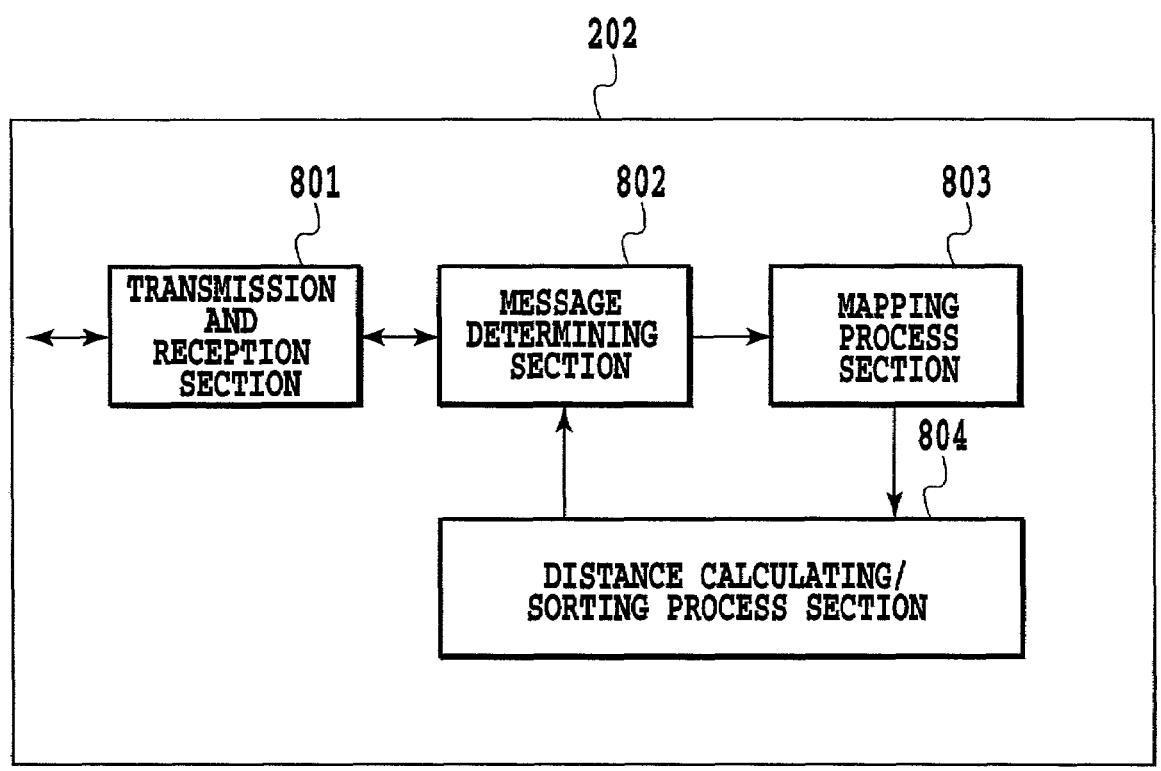
FIG. 14 is a block diagram showing a cell control apparatus according to the second embodiment of the present invention.

FIG. 14 shows a construction of the cell control apparatus according to the second embodiment of the present invention. The cell control apparatus 202 is composed of a transmission and reception section 801 as an interface for transmitting and receiving signals to and from the network 201, a message determining section 802 for analyzing a message from the mobile terminal received via the network, a mapping process section 803 for mapping the location of the mobile terminal from location information contained in the message, and a distance calculating/sorting process section 804 for selecting a base station to be subjected to a change, by distance calculations and a sorting process.

Figure 15:
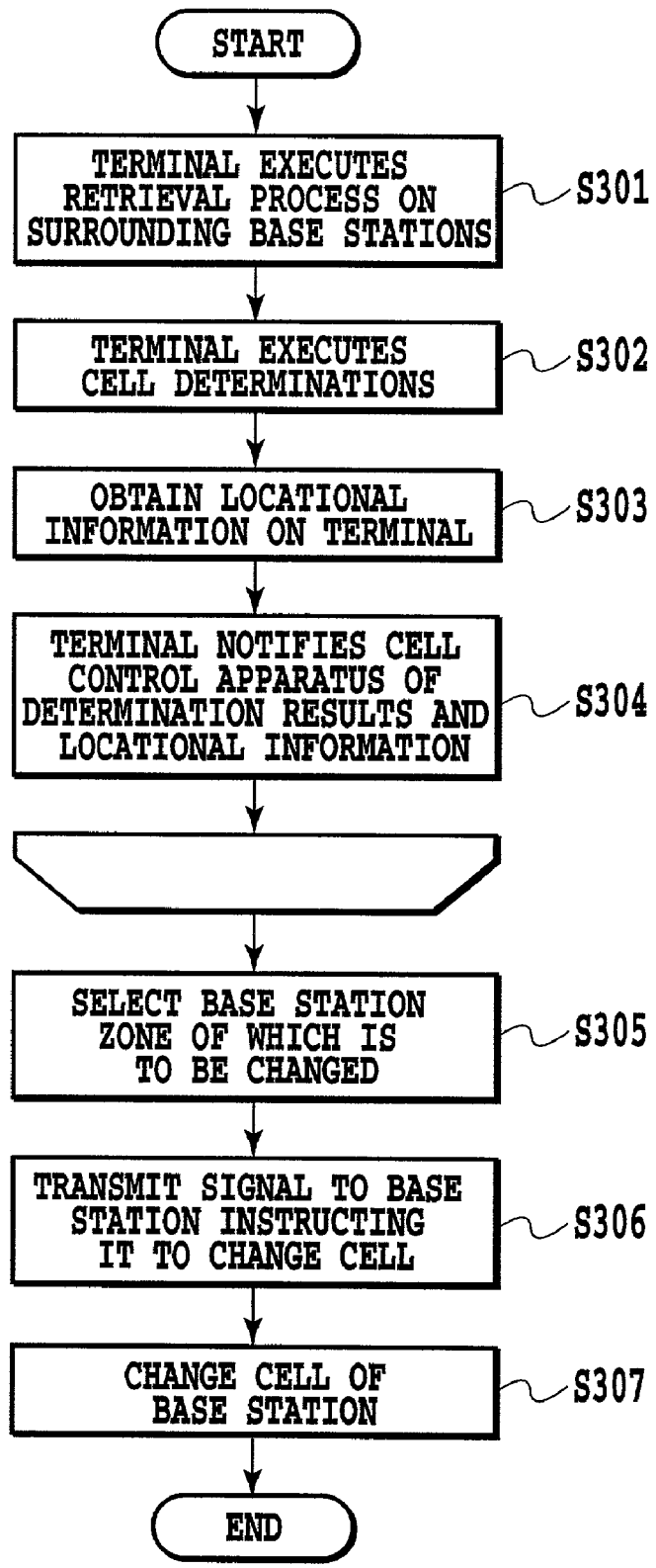
FIG. 15 is a chart showing a cell control method according to the second embodiment of the present invention.

FIG. 15 shows a cell control method according to the second embodiment of the present invention. When the mobile terminal is powered on, makes a call, or moves across cells, the cell control method according to the second embodiment is executed. First, the mobile terminal retrieves surrounding base stations in order to find ones which it can access (S301). The mobile terminal attempts to synchronize with a perch channel through which a signal is transmitted by the corresponding base station, to check whether or not it can receive the signal through this channel. Once the synchronization is established to indicate that the signal can be received through this perch channel, the mobile terminal determines that it belongs to the cell to which this base station provides services (S302). On the other hand, the mobile terminal may not synchronize with any perch channel even after a fixed time and may thus fail to receive a signal through a perch channel.

To achieve these determinations, all frequencies and transmission timings are retrieved which are used by the perch channels of the base stations. If the perch channels of the radio communication system consist of different frequency zones, the terminal retrieves all the relevant frequencies. If perch channels of the radio communication system use different timings for transmissions thereon, the retrieval process is executed for a time equal to or longer than the transmission period of any of the perch channels. Further, for a system in which perch channels are formed using a special spreading code, the terminal retrieves the spread code used by the perch channel.

Next, the mobile terminal receives a positioning signal from the GPS to obtain location information to identify the location from which the retrieval was executed (S303). The details will be described later. The mobile terminal notifies the cell control apparatus connected to the network of the results for cell determination and the location information (S304). The results for cell determination and location information from the mobile terminal are uniquely correlated with each other and then accumulated in the storage section of the cell control apparatus.

The cell control apparatus has a table for managing the identifiers of the base stations and the location of the relevant base station, so that retrieving this table enables the location of any base station to be determined. When a new station is installed, it is registered in this table. Since the cell control apparatus stores the identifiers of the base stations so as to correlate them with the results for cell determination and location information from the mobile terminal, the location of any base station can be identified simply by obtaining its identifier from the mobile terminal.

The cell control apparatus selects a base station for which the cell shape is to be changed, on the basis of the accumulated results for cell determination and location information from the mobile terminal (S305). The details will be described later. The cell control apparatus instructs the selected base station to change its cell shape (S360). The base station changes its cell shape according to the instruction from the cell control apparatus (S307).

As described above, each time a plurality of mobile terminals access a plurality of base stations, the results for cell determinations and location information from the mobile terminals are communicated to the cell control apparatus, which then accumulates all these data. If the results of a large number of cell determinations and a large amount of location information are accumulated for any base station, this indicates that a large number of mobile terminals have determined the cell of this base station. If one cell change is executed on the basis of the results of a large number of cell determinations, the cells are accurately changed. Since, however, it takes much time to accumulate the results of a large number of cell determinations, the cells are infrequently changed. On the other hand, if one cell change is executed on the basis of the results of a small number of cell determinations, cells are less accurately changed. Since, however, the time required to accumulate the results for cell determinations is short, the cells are frequently changed. After the results of a plurality of cell determinations and location information have been accumulated, a reference for determining whether or not the cell is to be changed can be provided, thereby avoiding unwanted cell changes to reduce loads on the mobile communication system.

Figure 16:
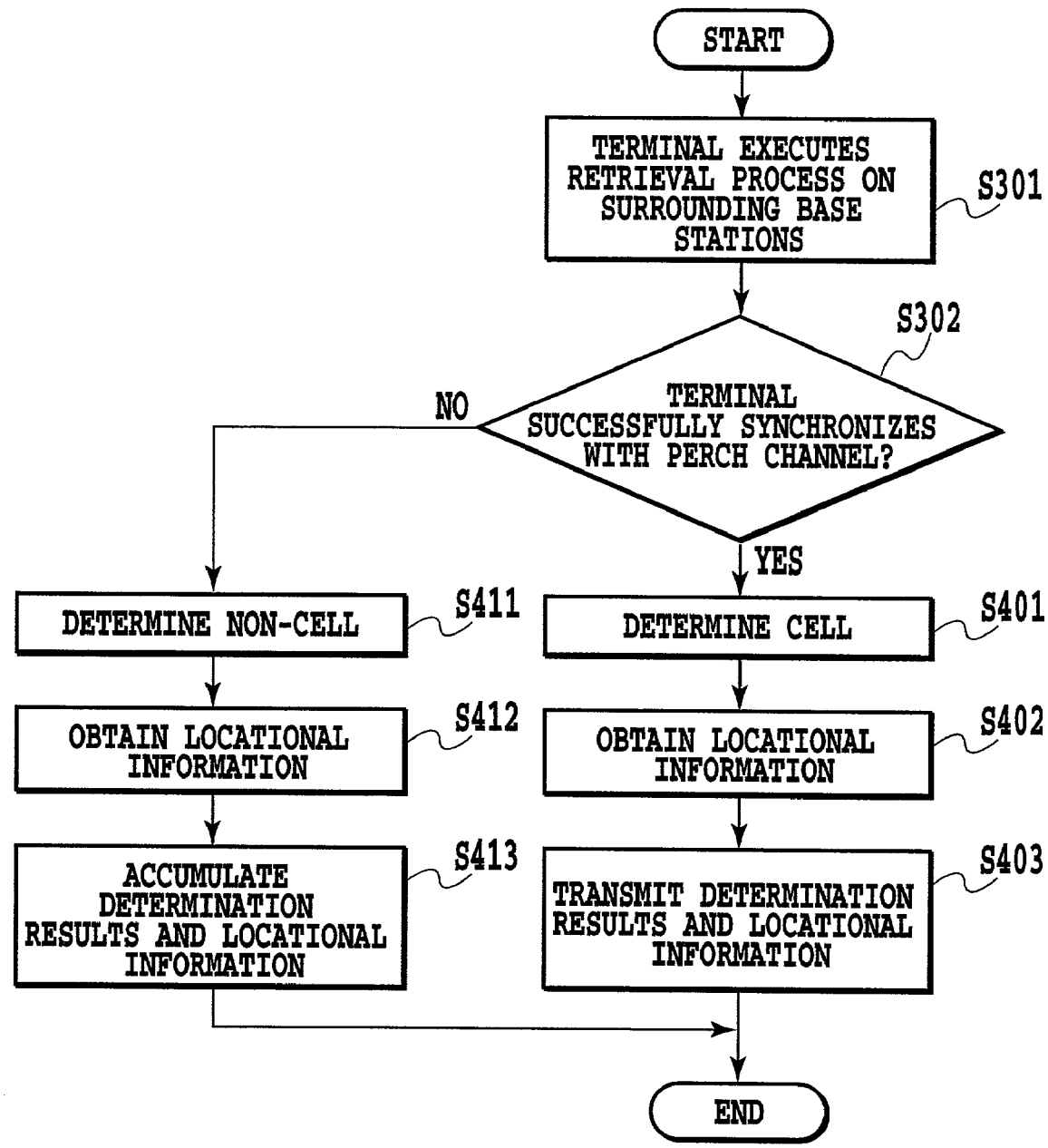
FIG. 16 is a flow chart showing a process executed by the mobile terminal according to the second embodiment of the present invention.
Figure 17:
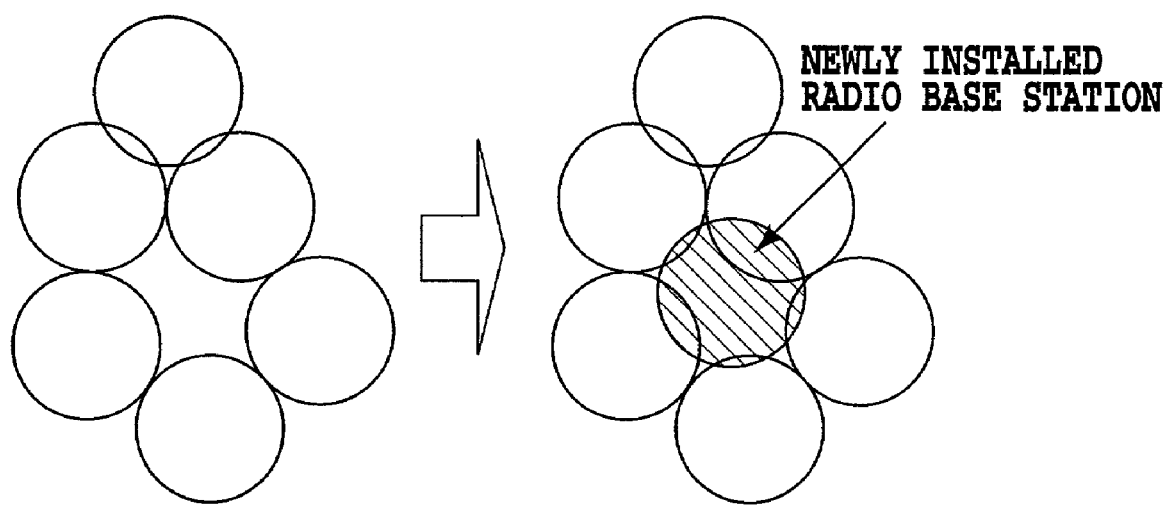
FIG. 17 is a diagram illustrating a method of determining cells in order to newly install a base station.
Figure 18:
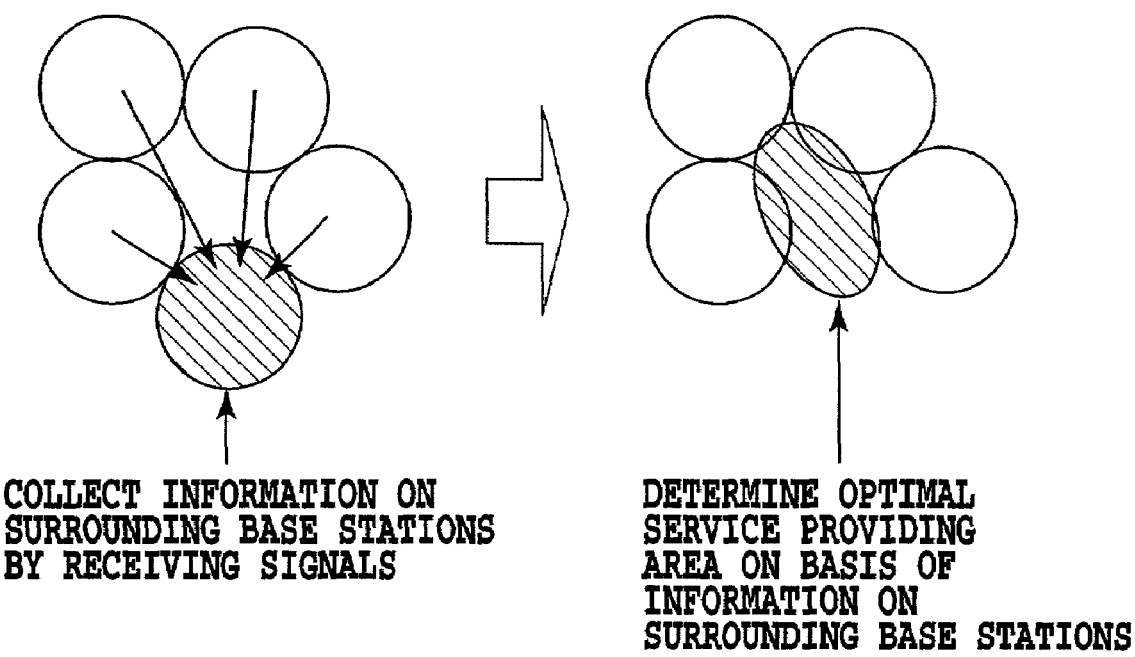
FIG. 18 is a diagram illustrating a method of receiving signals from surrounding base stations through perch channels.

FIG. 16 shows a process executed by the second embodiment of the present invention. With reference to FIG. 15, an explanation will be given of the method of using the GPS to obtain location information to identify the location where the retrieval was executed (S303). The GPS receives signals from a plurality of satellites to calculate the current position. The calculation results are used as the location information on the mobile terminal.

The mobile terminal executes the retrieval process on surrounding base stations (S301). If any base station transmits a signal, the mobile terminal attempts to synchronize with the perch channel through which this base station is transmitting the signal (S302). If the mobile terminal can establish the synchronization with this channel, it determines that it belongs to the cell to which this base station provides services (S401). At this time, the mobile terminal uses the GPS to obtain location information (S402), and transmits the results for cell determination, the location information on the mobile terminal, and information on the base station undergoing the determination, to the cell control apparatus (S403).

If the mobile terminal fails to synchronize with the perch channel and determines that it does not belong to the cell (S412), then it obtains location information using the GPS (S412), but does not transmit the location information or the like to the cell control apparatus; the mobile terminal accumulates these data inside itself (S403). At the location P(2) shown in FIG. 11, the mobile terminal determines that it does not belong to the cell to which the base station provides services, and accumulates results for non-cell determination and the location information. On moving to the location P(3), the mobile terminal determines that it belongs to the cell to which the base station 113 provides services, and thus continuously transmits the accumulated results for non-cell determination and location information as well as the results for cell determination and the location information, to the cell control apparatus via the base station 113.

On the basis of the location information on the mobile and base stations and the results for cell determination, the cell control apparatus changes the cell shape of the base station as required to always form a proper cell, thereby improving the quality of the services. The cell control apparatus retrieves base stations to be subjected to changes in order to determine a base station the cell of which is to be changed. This retrieval process is executed each time a result for non-cell determination is received from the mobile terminal, when a change from notification of the result for non-cell determination to notification of the result for cell determination has consecutively occurred N times, or when notification of the result for non-cell determination has been consecutively received M times.

The selection of a base station to be subjected to a change depends on the distances between a location where a new cell is to be set and surrounding base stations. The transmission power of the perch channel of the base station has an upper limit value, so that a cell covered by the upper limit value of the transmission power corresponds to a maximum value of the cell to which that base station can provide services.

Furthermore, the control executed by the cell control apparatus may be the same as the control executed by the above described cell forming process apparatus.

According to this embodiment, even if signals cannot be transmitted between the base stations through the perch channel, the cell of any base station can be changed to flexibly change the service area according to the needs. Compared to the conventional systematic schedule for the installation of base stations using a design method based on the situation of propagation, services can be provided according to the needs, thus allowing facilities to be effectively used. In particular, when a spot-based service provision form covering a particular area is shifted to a surface-based service provision form covering all areas, base stations covering small areas need not be installed, thereby enabling surrounding base stations to be effectively utilized by changing their cell shapes.

Further, according to this embodiment, an existing location information retrieving system represented by the GPS is used to identify the location of the base station, thereby allowing the service area to be accurately managed as data. Results of non-cell determinations are accumulated in the mobile terminal and subsequently transmitted to the cell control apparatus via a base station to which the mobile terminal can be connected. Consequently, data on cells to which no base stations provide services can be managed together with the other data, resulting in efficient operation.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A mobile station that can communicate with a first and a second radio communication system, the mobile station having reception means for receiving a transmitted signal from at least one base station of said first radio communication system and being characterized by comprising:
    determination means for determining whether or not a location at which the signal has been received belongs to a cell that is a service area of the at least one base station of the first radio communication system; and
    transmission means for transmitting a result of the determination of said determination means to a cell forming process apparatus via the second radio communication system;
    whereby said cell forming process apparatus selects a base station for which a cell shape of a corresponding cell of said first radio communication system is to be changed according to said result of determination and instructs the selected base station to change the cell shape thereof.

2. The mobile station according to claim 1, characterized in that said determination means makes said determination on the basis of whether or not synchronization is established with a perch channel of the at least one base station of said first radio communication system.

3. A cell forming process apparatus that can communicate with a mobile station via a first and a second radio communication system characterized by comprising:
    reception means for receiving, via a second radio communication system, a result of a determination of whether or not a mobile station belongs to a cell that is a service area of at least one base station of said first radio communication system, location information of said mobile station, and location information of said base station of said first radio communication system;
    selection means for selecting a base station for which a cell shape of a corresponding cell of said first radio communication system is to be changed; and
    instruction means for instructing the base station selected by the selection means to change the cell shape thereof.

4. The cell forming process apparatus according to claim 3, characterized in that said selection means includes mapping means for mapping cell and non-cell areas relating to the at least one base station of said first radio communication system, on the basis of the result received by said reception means.

5. The cell forming process apparatus according to claim 3, characterized in that said selection means includes calculation means for calculating a distance between the mobile station and the at least one base station of said first radio communication system on the basis of the location information of said mobile station received by said reception means as well as location information of the at least one base station; and
    means for selecting a base station that is closest to said mobile station, as a target the cell of which is to be changed, on the basis of a result of the calculation by the calculation means.

6. The cell forming process apparatus according to claim 3, characterized in that said selection means selects a base station having the lowest utilization of radio resources, as the target the cell of which is to be changed.

7. The cell forming process apparatus according to claim 3, characterized by further comprising collection means for collecting the result therein which has been received by said reception means so that the result collected in said collection means can be supplied to the selection means.

8. The cell forming process apparatus according to claim 4, characterized in that said selection means includes calculation means for calculating a distance between the mobile station and the at least one base station of said first radio communication system on the basis of the location information of said mobile station received by said reception means as well as location information of the at least one base station; and
    means for selecting a base station that is closest to said mobile station, as a target the cell of which is to be changed, on the basis of a result of the calculation by the calculation means.

9. The cell forming process apparatus according to claim 4, characterized in that said selection means selects a base station having the lowest utilization of radio resources, as the target the cell of which is to be changed.

10. A cell control method for a cell control system comprising a mobile station that can communicate with a first and a second radio communication system and a cell forming process apparatus for instructing a base station of said first radio communication system to change a cell thereof, the method comprising:
    receiving, at said mobile station, a transmitted signal from at least one base station of said first radio communication system,
    determining, at said mobile station, whether or not this receiving location belongs to a cell that is a service area of at least one base station of said first radio communication system,
    transmitting a result of said determination from said mobile station to said cell forming process apparatus via said second radio communication system,
    selecting, at said cell forming process apparatus, a base station for which a cell shape of a corresponding cell of said first radio communication system is to be changed, on the basis of the determination result transmitted by said mobile station, location information retrieved when said mobile station executes the determination process, and location information on the at least one base station of said first radio communication system, and instructing said selected base station to change the cell shape thereof from said cell forming process apparatus.

11. The cell control method according to claim 10, characterized in that the location information of said mobile station is retrieved, by said second radio communication system.

12. The cell control method according to claim 10, characterized in that the location information of said mobile station can be retrieved by the at least one base station of said first radio communication system.

13. The cell control method according to claim 10, characterized in that the location information of the at least one base station of said first radio communication system is retrieved by said cell forming process apparatus on the basis of an identifier of the base station transmitted by said mobile station together with said determination result.

14. A cell control system comprising a mobile station that can communicate with a first and a second radio communication system and has reception means for receiving a transmitted signal from at least one base station of said first radio communication system, and a cell forming process apparatus that can communicate with said mobile station via a first and a second radio communication system, the system being characterized in that:

said mobile station comprises determination means for determining whether or not a location at which the signal has been received belongs to a cell that is a service area of the at least one base station of the first radio communication system; and transmission means for transmitting a result of the determination of said determination means to a cell forming process apparatus via the second radio communication system, and in that:

said cell forming process apparatus comprises:

reception means for receiving, via a second radio communication system, a result of the determination of whether or not a mobile station belongs to a cell that is a service area of at least one base station of said first radio communication system, location information of said mobile station, and location information of said base station of said first radio communication system;

selection means for selecting a base station for which a cell shape of a corresponding cell of said first radio communication system is to be changed; and instruction means for instructing the base station selected by the selection means to change the cell shape thereof.

\* \* \* \* \*